(12) United States Patent
Jung et al.

(10) Patent No.: US 11,798,488 B2
(45) Date of Patent: Oct. 24, 2023

(54) MOBILE TERMINAL HAVING ALTERNATING FIRST AND SECOND DATA LINES ARRANGED IN AN OVERLAP AREA OF AN ACTIVE AREA

(71) Applicant: LG ELECTRONICS INC., Seoul (KR)

(72) Inventors: Sungon Jung, Seoul (KR); Hyunhak Cho, Seoul (KR); Hangyu Oh, Seoul (KR); Ilkyoung Cho, Seoul (KR); Yunsuk Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/779,080

(22) PCT Filed: Nov. 22, 2019

(86) PCT No.: PCT/KR2019/016095
§ 371 (c)(1),
(2) Date: May 23, 2022

(87) PCT Pub. No.: WO2021/100927
PCT Pub. Date: May 27, 2021

(65) Prior Publication Data
US 2022/0415260 A1 Dec. 29, 2022

(51) Int. Cl.
*G09G 3/3266* (2016.01)
*G09G 3/00* (2006.01)
(Continued)

(52) U.S. Cl.
CPC ........... *G09G 3/3266* (2013.01); *G09G 3/035* (2020.08); *G09G 3/2007* (2013.01);
(Continued)

(58) Field of Classification Search
CPC .................................................... G09G 3/3266
(Continued)

(56) References Cited

U.S. PATENT DOCUMENTS

2006/0055645 A1 3/2006 Kim
2015/0049041 A1 2/2015 Yousefpor
(Continued)

FOREIGN PATENT DOCUMENTS

KR 10-2013-0141068 12/2013
KR 10-2018-0117976 10/2018
(Continued)

OTHER PUBLICATIONS

PCT International Application No. PCT/KR2019/016095, Written Opinion of the International Searching Authority dated Aug. 21, 2020, 5 pages.
(Continued)

*Primary Examiner* — Long D Pham
(74) *Attorney, Agent, or Firm* — LEE HONG DEGERMAN KANG & WAIMEY

(57) ABSTRACT

A mobile terminal according to one embodiment is characterized by comprising: a display panel including active areas from which images are output; a first driver for controlling an image output from a first active area among the active areas; a second driver for controlling an image output from a second active area among the active areas; first data lines connected to the first driver to apply an image signal to the first active area; and second data lines connected to the second driver to apply an image signal to the second active area, wherein the first data lines and the second data lines may be provided in the active areas alternately in at least one area.

9 Claims, 21 Drawing Sheets

(51) Int. Cl.
  *G09G 3/20* (2006.01)
  *G09G 3/3233* (2016.01)
  *G09G 3/3275* (2016.01)
(52) U.S. Cl.
  CPC ......... *G09G 3/3233* (2013.01); *G09G 3/3275* (2013.01); *G09G 2300/0842* (2013.01); *G09G 2310/0286* (2013.01); *G09G 2320/0233* (2013.01); *G09G 2330/021* (2013.01)
(58) Field of Classification Search
  USPC ....................................................... 345/690
  See application file for complete search history.

(56) References Cited

U.S. PATENT DOCUMENTS

| | | | |
|---|---|---|---|
| 2015/0085000 A1 | 3/2015 | Lin et al. | |
| 2015/0243202 A1* | 8/2015 | Lombardi | G09G 3/2092 |
| | | | 345/520 |
| 2016/0189655 A1 | 6/2016 | Choi et al. | |
| 2017/0135213 A1* | 5/2017 | Lee | G09G 3/2092 |
| 2018/0211974 A1 | 7/2018 | Chen et al. | |
| 2019/0228713 A1* | 7/2019 | Tamura | G09G 3/3225 |
| 2019/0261519 A1 | 8/2019 | Park et al. | |

FOREIGN PATENT DOCUMENTS

| | | |
|---|---|---|
| KR | 10-2019-0015688 | 2/2019 |
| KR | 10-2019-0093184 | 8/2019 |

OTHER PUBLICATIONS

European Patent Office Application Serial No. 19953345.6, Search Report dated Jul. 6, 2023, 12 pages.

* cited by examiner

FIG. 3
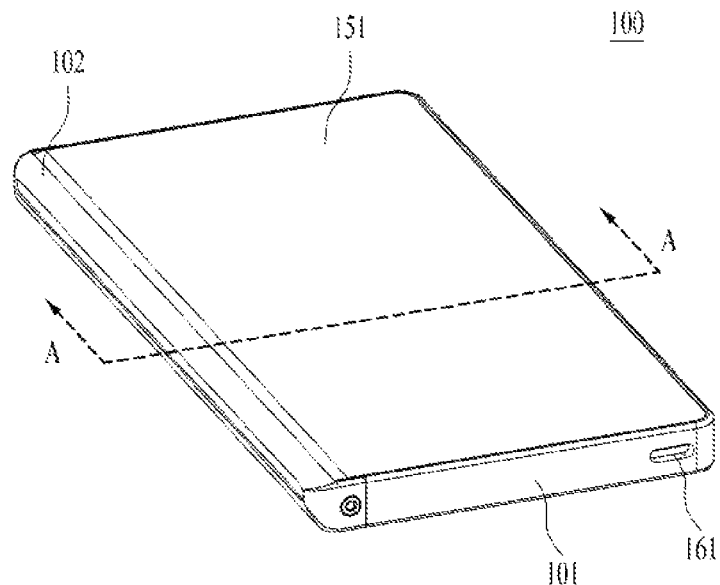
(a)
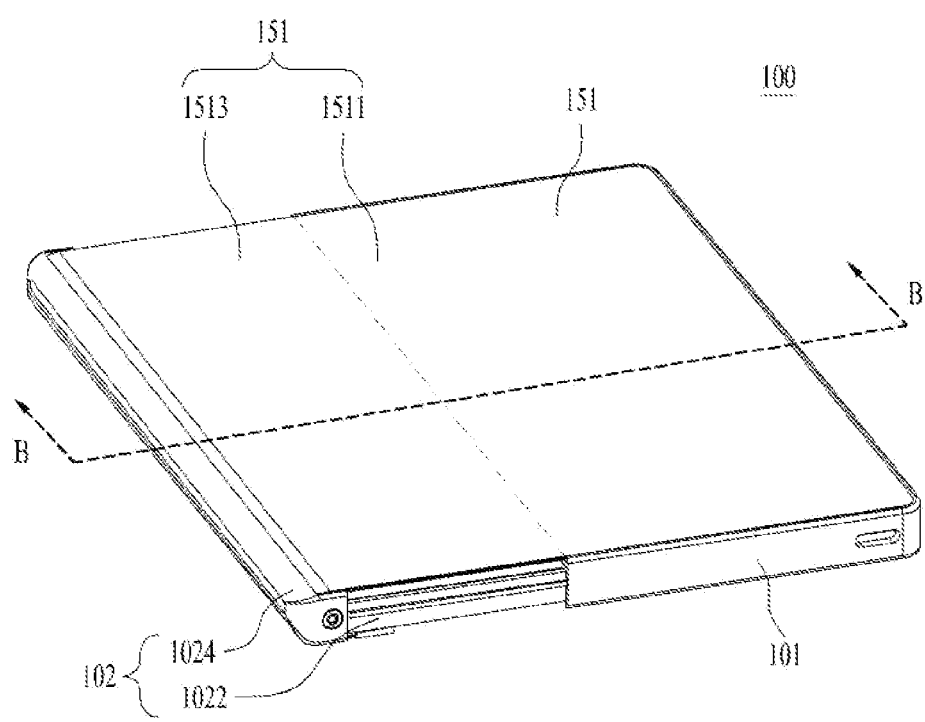
(b)

FIG. 4
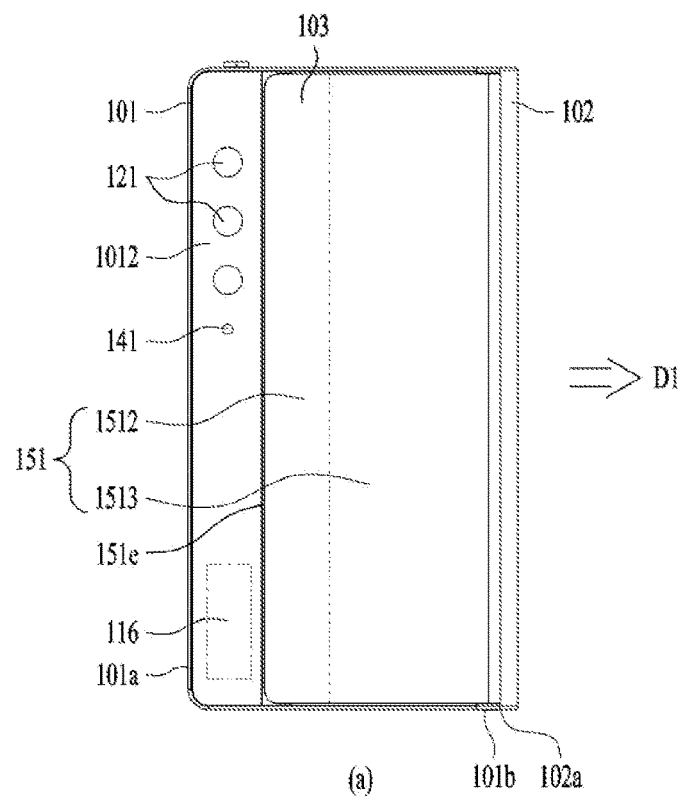
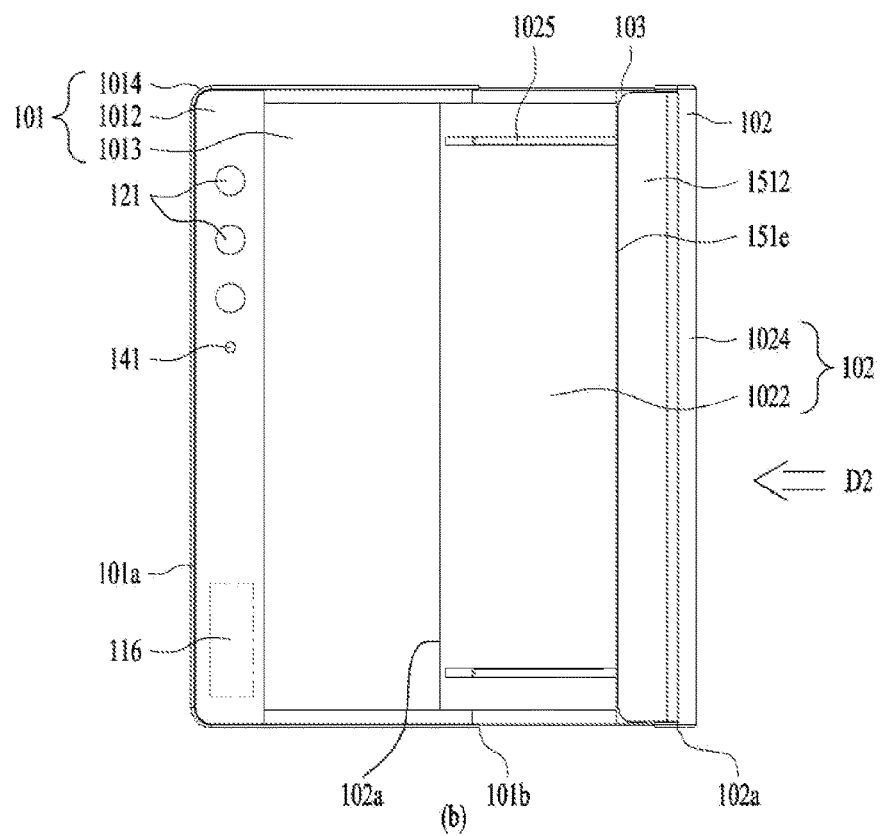

(a)                (b)

ical Field

The present disclosure relates to a mobile terminal, and is applicable to a technology field that controls a widened display in a divided manner.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device having a function of receiving, processing, and displaying a video that a user may watch. For example, the display device receives a broadcast selected by the user from broadcast signals transmitted from a broadcasting station, separates a video signal from the received signals, and displays the separated video signal on a display.

In recent years, because of a development of a broadcasting technology and a network technology, functions of the display device have also been considerably diversified, and a performance of the device has been improved accordingly. That is, the display device has been developed to provide not only broadcast contents but also various other contents to the user. For example, the display device may provide game play, music listening, internet shopping, user customized information, and the like using various applications as well as programs received from the broadcasting station. In order to perform such extended functions, the display device may be basically connected to other devices or networks using various communication protocols, and may provide the user with a ubiquitous computing environment. In other words, the display device has evolved into a smart device that enables connectivity to a network and continuous computing.

In one example, recently, the mobile terminal provides a larger screen to the user. The mobile terminal may provide a large screen that is folded in one direction as a foldable mobile terminal or may provide a large screen that is expanded or contracted in one direction as a rollable mobile terminal.

DISCLOSURE

Technical Problem

The present disclosure is to prevent, in a mobile terminal that divides a large screen into two opposing areas and outputs one image via two drivers, a user from recognizing a boundary of the divided areas due to a luminance deviation that occurs between the divided areas.

Technical Solutions

In order to achieve the above object, a mobile terminal according to one embodiment includes a display panel including an active area for outputting an image, a first driver for controlling an image output from a first active area of the active area, a second driver for controlling an image output from a second active area of the active area, first data lines connected to the first driver so as to apply an image signal to the first active area, and second data lines connected to the second driver so as to apply an image signal to the second active area, and the first data lines and the second data lines are alternately arranged in at least one area of the active area.

In addition, according to one embodiment, the at least one area may be defined along a center of both sides in the active area, the first data lines not arranged in the at least one area may be arranged on one side of the at least one area, and the second data lines not arranged in the at least one area may be arranged on the other side of the at least one area.

In addition, according to one embodiment, the first driver may include a first data driver for applying the image signal via the first data lines, and a first gray scale voltage generator for supplying a gray scale voltage to the first data driver, the second driver may include a second data driver for applying the image signal via the second data lines, and a second gray scale voltage generator for supplying a gray scale voltage to the second data driver, and voltages respectively applied to the first gray scale voltage generator and the second gray scale voltage generator so as to generate the gray scale voltages may have a slight difference therebetween.

In addition, according to one embodiment, the first driver may include a first gate driver disposed in an edge at one side of the display panel along the first data lines so as to apply a driving signal to the first active area, and the second driver may include a second gate driver disposed in an edge at the other side of the display panel along the second data lines so as to apply a driving signal to the second active area.

In addition, according to one embodiment, the first gate driver may be connected to first gate lines which are extending perpendicular to the first data lines and for applying the driving signal, the second gate driver may be connected to second gate lines be which are extending perpendicular to the second data lines for applying the driving signal, and the first gate lines and the second gate lines may intersect each other at a central portion of both sides in the active area.

In addition, according to one embodiment, the first driver may include a first timing controller for applying a control signal to the first gate driver and the first data driver, the second driver may include a second timing controller for applying a control signal to the second gate driver and the second data driver, and the mobile terminal may further include control signal sink means for synchronizing the control signals respectively provided by the first timing controller and the second timing controller with each other.

In addition, according to one embodiment, the display panel may be a flexible display panel.

In addition, according to one embodiment, the mobile terminal may further include a roller member for changing an area of the active area exposed on a front face of the mobile terminal by winding or bending the display panel along a first direction, wherein the first data lines or the second data lines are directed in the first direction.

In addition, according to one embodiment, the mobile terminal may further include a first frame, and a second frame including the roller member and coupled to the first frame to be movable in the first direction.

In addition, according to one embodiment, the image output from the first active area and the image output from the second active area may be one connected image.

Advantageous Effects

Based on the above purpose, the mobile terminal according to one embodiment may prevent the user from recognizing the luminance deviation in outputting the image by dividing the large screen into the two opposing areas via the two drivers.

In addition, the mobile terminal according to one embodiment may prevent the user from recognizing the time difference of the image output in outputting the image by dividing the large screen into the two opposing areas via the two drivers.

DESCRIPTION OF DRAWINGS

FIG. 3 shows perspective views respectively illustrating a first state and a second state viewed from one side of a mobile terminal according to one embodiment;

FIG. 4 shows rear face views respectively illustrating a first state and a second state of a mobile terminal according to one embodiment;

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

The terminology used in the present disclosure is used only to describe specific embodiments, not intended to limit the present disclosure. A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
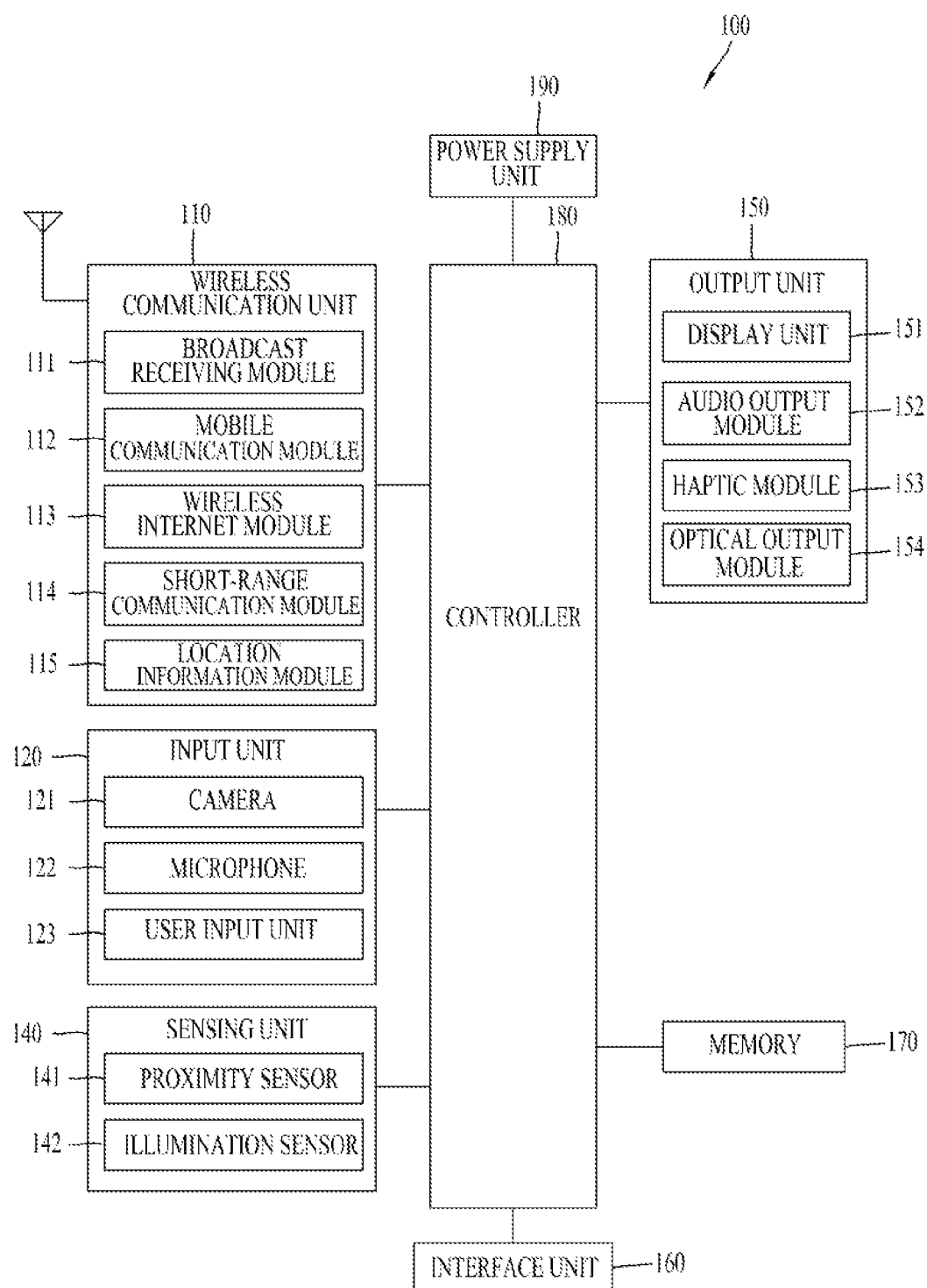
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
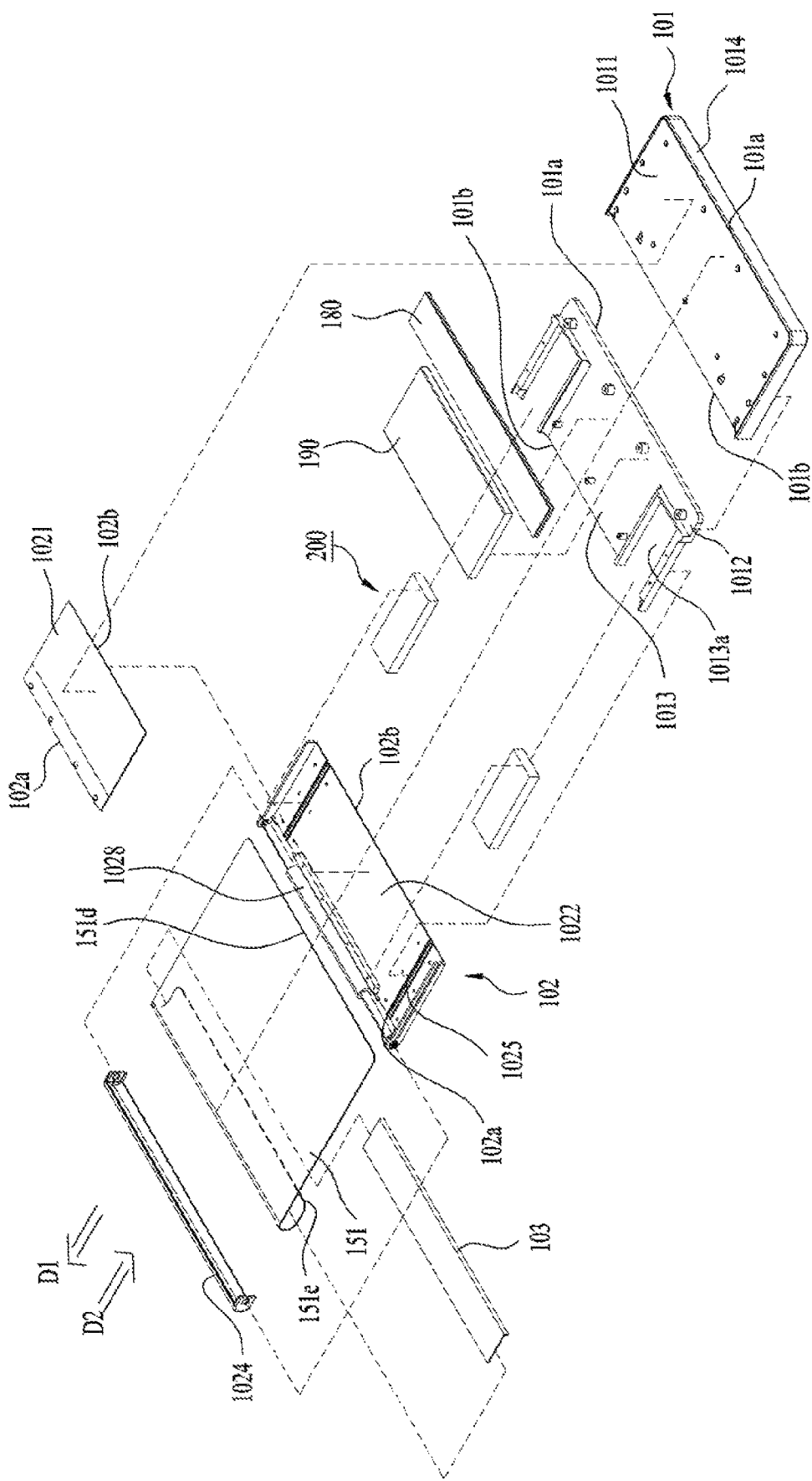
FIG. 2 is an exploded perspective view of a mobile terminal according to one embodiment.
Figure 5:
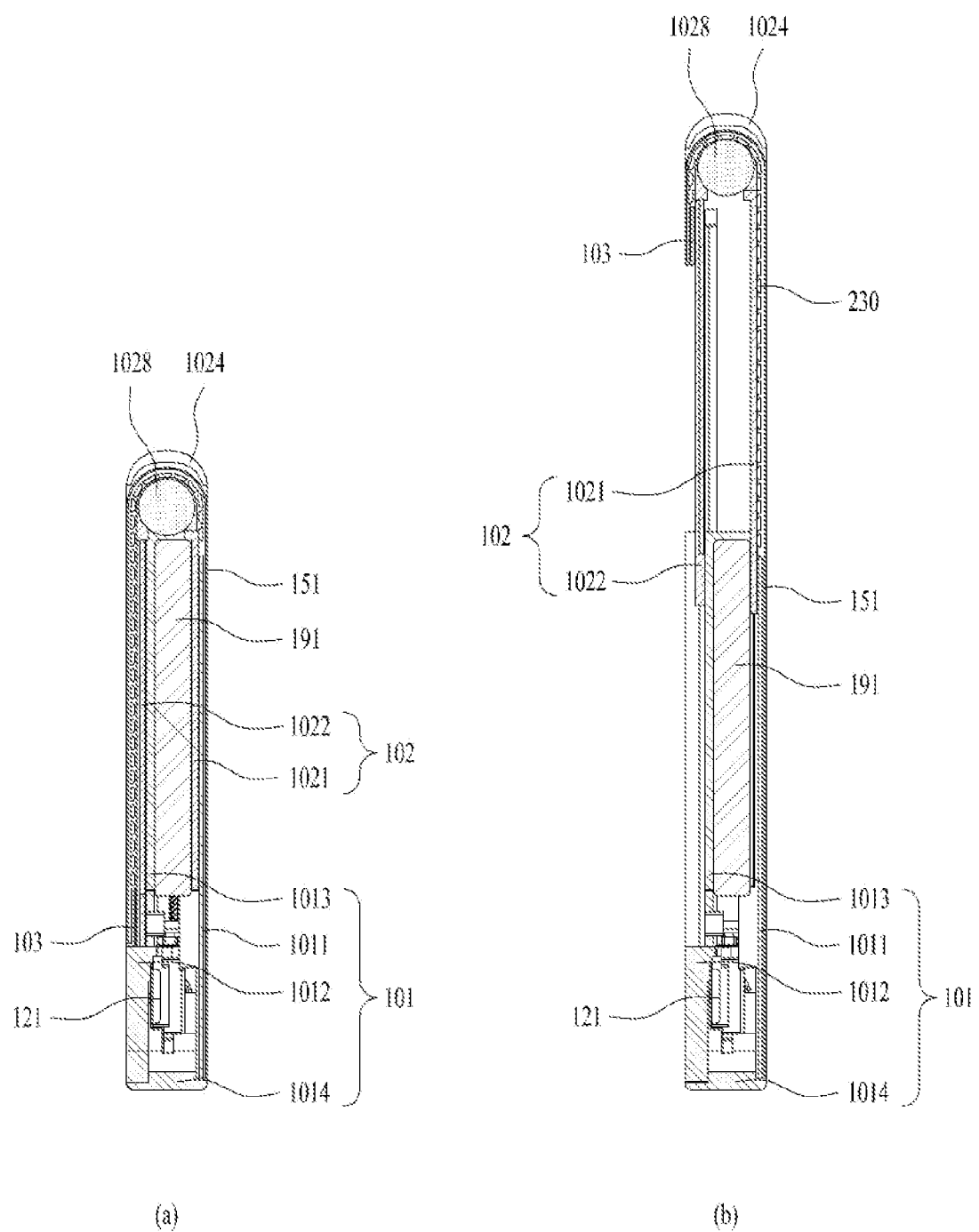
FIG. 5 shows cross-sectional views respectively taken along a line A-A and a line B-B of FIG. 3.

FIG. 2 is an exploded perspective view of a mobile terminal according to one embodiment. Further, FIG. 3 shows perspective views respectively illustrating a first state and a second state viewed from one side of a mobile terminal according to one embodiment. Further, FIG. 4 shows rear face views respectively illustrating a first state and a second state of a mobile terminal according to one embodiment. Further, FIG. 5 shows cross-sectional views respectively taken along a line A-A and a line B-B of FIG. 3. In these drawings, FIGS. 3(a), 4(a), and 5(a) show a first state of the mobile terminal, and FIGS. 3(b), 4(b), and 5(b) show a second state of the mobile terminal.

As shown, a mobile terminal 100 in a first state is contracted, and has a smaller size than the mobile terminal 100 in a second state. In addition, a size of a display unit 151 located disposed on a front face of the mobile terminal 100 also becomes smaller than that of the display unit 151 in the second state. The mobile terminal 100 of the first state is expanded in a first direction D1 to be in the second state. In the second state, the size of the mobile terminal 100 and a size of a front face of the display unit 151 are larger than those in the first state. In a following description, a direction in which the mobile terminal 100 and the display 151 thereof are extended or enlarged is referred to as a first direction D1, a direction in which the mobile terminal 100 and the display 151 thereof are contracted or retracted, or reduce to be converted into the first state from the second state is referred to as a second direction D2, and a direction perpendicular to the first and second directions D1 and D2 is referred to as a third direction.

The mobile terminal 100 of the present disclosure may be converted from the first state in which the display unit 151 is positioned on the front face of a bar-shaped mobile terminal as shown in FIG. 3(a) into the second state as shown in FIG. 3(b) by enlarging a screen thereof. In the second state, an area of the front face of the display unit 151 is enlarged, and an area of a rear face of the display unit 151 is reduced as shown in FIG. 4(b). That is, the display unit 151 positioned on a rear face of the mobile terminal 151 in the first state moves to the front face of the mobile terminal 100 in the second state.

As such, the display unit may use a flexible display unit 151 that may be bent such that the position of the display unit may be varied. The flexible display is a lightweight, unbreakable, and durable display that is built on a thin and flexible substrate that may be bent, crooked, folded, twisted, or rolled while retaining properties of a conventional flat panel display.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display area of the flexible display unit 151 becomes flat. In a state in which the flexible display unit 151 is deformed by an external force from the basic state (e.g., a state of having a finite radius of curvature, hereinafter referred to as a deformed state), the display area may become a curved face. As shown, information displayed in the deformation state may be visual information output on the curved face. Such visual information is implemented by independently controlling light emission of sub-pixels arranged in a matrix. The sub-pixel refers to a minimum unit for implementing one color.

The flexible display unit 151 may be in a curved state (e.g., a vertically or horizontally curved state) rather than a flat state in the basic state. In this case, when the external force is applied to the flexible display unit 151, the flexible display unit 151 may be deformed into the flat state (or a less curved state) or more curved state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to third frames 101 to 103 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may be various information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200 to be described later.

The flexible display unit 151 of the present disclosure is bent 180 degrees while being rolled on one of both sides of the mobile terminal 100. Thus, a portion of the display unit 151 is disposed on the front face of the mobile terminal 100 based on such side, and the other portion thereof is disposed on the rear face of the mobile terminal 100. A portion of the display unit 151 located on the front face of the mobile terminal 100 may be fixed to the front face so as not to move. Further, the other portion thereof located on the rear face of the mobile terminal 100 may be movable to the rear face.

In addition, the display unit 151 may be rolled on or released from the side. Accordingly, the portion disposed on the rear face of the mobile terminal 100 moves, so that the size of the portion disposed on the front face of the mobile terminal 100 may be adjusted. Since the area of the flexible display unit 151 is determined and the flexible display unit 151 is formed of one continuous body, an area of the portion on the rear face decreases as an area of the portion on the front face increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

With reference to FIGS. 2 to 5, a detailed configuration of the mobile terminal 100 of the present disclosure will be described in detail below. A following description will be achieved basically with reference to FIG. 2 illustrating an overall configuration. FIGS. 3 to 5 are referred to explain detailed features of corresponding components in the first and second states of the mobile terminal 100.

The mobile terminal 100 of the present disclosure includes a main frame in which components are mounted, and the main frame of the present disclosure may vary in size in the first direction as shown in FIG. 2. One or more frames move relative to each other, and sizes thereof may vary in the first direction. Electronic components are mounted in the main frame, and the flexible display unit 151 is located out of the main frame.

Since the mobile terminal 100 of the present disclosure includes the flexible display unit, the flexible display unit 151 may be combined in a form surrounding a front face and a rear face of the main frame. The main frame may include first to third frames 101 to 103. The main frame may include the first frame 101, the second frame 102 moving in the first direction with respect to the first frame 101, and the third frame 103 moving in the first direction with respect to the second frame 102. The first frame 101 and the second frame 102 include front portions, rear portions, and side portions, respectively, and are coupled to each other. Thus, the mobile terminal 100 may have a hexahedral outer shape by such coupled first and second frames 101 and 102. In consideration of a illustrated configuration of the first to third frames 101 to 103, movements of the second and third frames 102 and 103 may be a slide movement.

First, the first frame 101 corresponds to a main body of the mobile terminal 100, and may have a space therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and a first rear portion 1012 and a second rear portion 1013 disposed at a rear portion of the mobile terminal.

Such first front portion 1011, first rear portion 1012, and second rear portion 1013 may be respectively formed of plate-shaped members that are generally flat. The first rear portion 1012 and the second rear portion 1013 may be respectively formed of separate members coupled to each other or may be formed of one member as shown. The first front portion 1011 and the first rear portion/second rear portion 1012 and 1013 may be spaced apart from each other at a predetermined spacing to define a predetermined space therebetween, and may be connected to each other by a side portion 1014. The controller 180 and the power supply unit 190 may be accommodated as components of the mobile terminal 100 in the space in the first frame 101. For example, the controller 180 may be a circuit board including a processor and an electronic circuit for controlling the operation of the mobile terminal, and the power supply unit 190 may be a battery and related components. In addition, the second frame 102 and the driving unit 200 to described later may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. When the flexible display unit 151 may be damaged when being bent. Thus, the flexible display unit 151 may be formed to be bent with a predetermined curvature.

The display unit 151 may be divided into a fixed portion and a variable portion. The fixed portion means a portion fixed to the frame. Because of being fixed to the frame, the fixed portion maintains a constant shape without changing a bending degree. On the other hand, the variable portion means a portion in which a bending angle or a position of the bent portion changes. The variable portion in which the position or bending angle of the bent portion changes requires a structure for supporting a rear face of the variable portion in response to the change.

A first area of the display unit 151 may be coupled to the first front portion 1011 corresponding to the front face of the mobile terminal 100.

In one example, as shown in FIG. 4, various physical input units 120 for manipulation of the mobile terminal 100 and sensing units 140 may be located on the first rear portion 1012, and the display unit 151 may be disposed only on the second rear portion 1013. Since the first rear portion 1012 does not overlap the flexible display unit 151 regardless of the state of the mobile terminal, and is always exposed to the outside, the input unit 120 such as various buttons, switches, the camera 121, and a flash, and the sensing unit 140 such as a proximity sensor 141 may be arranged on the first rear portion 1012. In a conventional bar-shaped terminal, a display unit is provided only on a front face of the terminal. Therefore, a main camera is placed on a rear face of the terminal in order for the user to capture an object at an opposite side while looking through the display unit. On the other hand, an additional auxiliary camera is required to be disposed on the front face of the terminal in order for the user to capture himself or herself while viewing himself or herself through the display unit.

However, the display unit 151 is positioned both the front face and the rear face of the mobile terminal 100 of the present disclosure. Therefore, when the user captures himself or herself, a display unit on the same face as the camera 121, that is, the portion of the display 151 on the rear face of the mobile terminal 100 in the drawing may be used. Further, when the user captures the object on the opposite side of the user, a display unit on the opposite face of the camera 121, that is, the portion of the display unit 151 on the front face of the mobile terminal 100 in the drawing may be used. For this reason, the mobile terminal 100 may capture the object on the opposite side of the user and capture the user using the single camera 121. The camera may include a plurality of cameras having different angles of view, such as wide angle, super wide angle, and telephotographic cameras. In addition to the camera, a proximity sensor sound output unit may be positioned on the first rear portion 1012, and an antenna 116 may be installed on the first rear portion 1012.

The side portion 1014 may extend along edges of the first front portion 1011 and the first rear portion/second rear portion 1012 and 1013 to surround the first frame 101, and may form the outer shape of the mobile terminal 100. However, as mentioned above, since the second frame 102 is accommodated in the first frame 101 and is movably coupled thereto, in order to allow the movement of the second frame 102 relative to the first frame 101, a portion of the first frame 101 needs to be opened. As shown in FIG. 2, as an example, the second frame 102 is movably coupled to one of both side portions of the first frame 101, so that the side portion 1014 may not be formed on the same side portion, and thus, the portion of the first frame 101 may be opened. Accordingly, the first frame 101 may include a substantially closed first side portion 101a and a second side portion 101b, which is disposed to be opposite to the first side portion 101a and is opened. The side portion 1014 is exposed to the outside of the mobile terminal 100, so that an interface unit 160 for connecting a supply port or an ear jack, the user input unit 120 such as a volume button, or the like may be disposed on the side portion 1014. When containing a metal material, the side portion 1014 may serve as an antenna.

The second rear portion 1013 of the first frame 101 may be covered by the display unit, but may be disposed on the front face of the display unit using a transparent material.

The second frame 102 may include a second front portion 1021 disposed at the front portion of the mobile terminal 100 and a third rear portion 1022 disposed at the rear portion of the mobile terminal 100. Like the first front portion 1011 and the first rear portion 1012 of the first frame 101, the second front portion 1021 and the third rear portion 1023 may be formed of plate-shaped members that are generally flat. In addition, the second frame 102 also accommodates various components, and must not interfere with the components accommodated in the first frame 101 during the movement. Accordingly, the second front portion 1021 and the third rear portion 1022 may be coupled to each other in a state of being spaced apart from each other to define a predetermined space therebetween, and may have shapes that do not interfere with the components in the first frame 101.

In addition, the display unit 151 may be bent 180 degrees while being rolled in the second frame 102 to be disposed on both the front face and the rear face of the mobile terminal 100. For such an arrangement of the display unit 151, the second frame 102 may include a roller 1028 rotatably disposed therein. The roller 1028 may be disposed at any position inside the second frame 102. However, the display unit 151 should be spread flat on the front face and the rear face of the mobile terminal 100 to provide a good quality screen to the user. Further, for such spread, a proper tension must be provided on the display unit 151. In order to provide the proper tension, the roller 1028 may be disposed at a first directional end of the second frame 102. The roller 1028 may extend in the third direction, and may be rotatably coupled to the second frame 102.

The display unit 151 may be rolled around the roller 1028 while being gently bent with a predetermined curvature. The flexible display unit 151 may include a first face on which a video is output and exposed to the outside and an inner face facing the frame at the opposite side. The roller 1028 may be installed to rotate freely in the second frame 102 while being in contact with the inner face of the display unit 151. Accordingly, the roller 1028 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (i.e., the first direction D1 or the second direction D2) relative to the second frame 102. The roller 1028 may guide such movement while rotating.

In addition, the roller 1028 is disposed on a first side portion 102a of the second frame 102, and the first side portion 102a actually corresponds to an outermost side portion of the mobile terminal 100. When the first side portion 102a of the second frame 102 is exposed, the display unit 151 rolled on the roller 1028 may be damaged. Accordingly, the second frame 102 may include a side frame 1024 disposed on the first side portion 102a.

The side frame 1024 extends in the longitudinal direction of the second frame 102 to cover the first side portion 102a, thereby protecting the roller 1028 and the display unit 151 rolled thereon. That is, the side frame 1024 covers the side face of the display unit 151, and the side face thereof is located in the third area. The first to third areas are at specified positions on the flexible display unit and do not change in size or position, but the sizes of the front face and the rear face, and the position of the side face are determined based on the state of the main frame. The first area and the second area correspond to the fixed portion described above, and the third area corresponds to the variable portion described above.

The third area may vary in position depending on the state of the mobile terminal.

Because the side face is rolled by the roller, the side face is bent with the predetermined curvature, and an inner face of the side frame may include a curved face corresponding to the curvature of the side face.

Because of the side frame 1024, the second frame 102 may have the substantially closed first side portion 102a, and the side frame 1024 may substantially form the outer shape of the mobile terminal 100 together with the side face 1014 of the first frame 101. In addition, the second frame 102 may include a second side portion 102b that is disposed opposite the first side portion 102a to minimize interference with the components within the first frame 101 during the movement, and is opened.

Such a second frame 102 is movably coupled to the first frame 101, and thus may slide in the predetermined first or second direction D1 or D2 relative to the first frame 101. More specifically, the second frame 102 may be movably coupled to the first frame 101 through the side portion of the first frame 101, more precisely, through the opened second side portion 101b, as shown. More specifically, the second side portion 102b of the second frame is disposed relatively adjacent to the first side portion 101a of the first frame 101 which is closed. Accordingly, the first side portion 102a of the second frame may be disposed to be opposite to the first side portion 101a. Accordingly, the second side portion 102b is inserted into the first frame 101 through the side portion of the first frame, that is, the second side portion 101b thereof. The first side portion 102a is not inserted into the first frame 101 but is always located outside the first frame 101, thereby forming the outer shape of the mobile terminal 100 as described above. However, when necessary, such first side portion 102b of the second frame 102 may also be inserted into the first frame 101.

Because of such positional relationship, the second frame 102 may extend from or contract to the first frame 101 in a direction perpendicular to the longitudinal direction of the mobile terminal 100 or the first frame 101. That is, the first and second directions D1 and D2 may basically be directions perpendicular to the longitudinal direction of the mobile terminal 100 or the first frame 101. Further, the first and second directions D1 and D2 may also be described as the lateral direction or the horizontal direction of the mobile terminal 100 or the first frame 101. In addition, during the movement in the first direction D1, the second frame 102 extends from the first frame 101. Accordingly, the first direction D1 may be a direction in which the second frame 102 moves away from the first frame 101, that is, moves outwardly of the mobile terminal 100 or the first frame 101. On the other hand, during the movement in the second direction D2, the second frame 102 contracts to the first frame 101. Thus, the second direction D2 is a direction opposite to the first direction D1, so that the second direction D2 may be a direction in which the second frame 102 moves to become closer to the first frame 101, that is, moves inwardly of the mobile terminal 100 or the first frame 101. When being moved in the first direction D1, such second frame 102 extends and applies a force to the portion of the display unit 151 disposed on the rear face of the mobile terminal 100, so that the portion of the display unit 151 may be disposed on the front face of the mobile terminal 100, and an area for such additional arrangement may be defined. Thus, the second frame 102 may convert the mobile terminal 100 into the second state with the display unit 151 with the relatively extended front face by moving in the first direction D1. On the other hand, when being moved in the second direction D2, the second frame 102 contracts into an original state thereof, and applies a force to the portion of the display unit 151 disposed on the front face of the mobile terminal 100 to return to the rear face of the mobile terminal 100 again. Thus, the second frame 102 may convert the mobile terminal 100 into the first state with the display unit 151 with the relatively contracted front face by moving in the second direction D2. Accordingly, the second frame 102 selectively exposes the display unit 151 to the front face of the mobile terminal 100 depending on the moving direction (i.e., the first or second direction D1 and D2). Accordingly, the mobile terminal 100 may be converted into the first or second state defined above.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, as shown in FIG. 5. That is, a front face of the second front portion 1021 may face the rear face of the first front portion 1011. In addition, the rear face of the first front portion 1011 may be in contact with the front face of the second front portion 1021 to stably support the movement of the second frame 102.

The third rear portion 1022 of the second frame 102 may be disposed below the second rear portion 1013 of the first frame 101. That is, the front face of the third rear portion 1022 may face the rear face of the second rear portion 1013. In addition, the rear face of the second rear portion 1013 may be in contact with the front face of the third rear portion 1022 to stably support the movement of the second frame 102. Because of such arrangement, the third rear portion 1022 may be exposed to the outside of the first frame, more precisely, of the second rear portion 1013, and may be coupled to the display unit 151.

Alternatively, when the second rear portion 1013 is made of a transparent material, the second rear portion 1013 may form an outer shape of the rear face of the mobile terminal. The second rear portion 1013 may be positioned rearward of the third rear portion 1022 of the second frame, and the flexible display unit may be disposed between the second rear portion 1013 and the third rear portion 1022 in the first state.

When the second rear portion 1013 is made of a material such as a transparent glass to form the outer shape of the rear face of the mobile terminal, the first rear portion 1012 may be implemented using the same member as the second rear portion 1013. That is, the camera 121, the flash or the sensing unit 140, and the like may be arranged by partially coating the plate-shaped member of the transparent glass material to not allow the internal components to be visible and by not coating only a required portion.

In addition, the second frame 102 may expand and contract the size of the mobile terminal 100 itself, particularly the front face of the mobile terminal 100 by the expansion and the contraction in the first and second directions D1 and D2. Thus, the display unit 151 must move by such extended or reduced front face size to obtain the intended first and second states. However, when being fixed to the second frame 102, the display unit 151 may not be moved smoothly to be adapted for the front face of the mobile terminal 100 that is expanded or contracted. For this reason, the display unit 151 may be movably coupled to the second frame 102. More specifically, the display unit 151 may include a first side edge (or side end) 151d disposed on the front face of the mobile terminal 100 and a second side edge 151e opposite to the first side edge 151d and disposed on the rear face of the mobile terminal 100. The first side edge 151 may be disposed on the front face of the first frame 101, that is, the front face of the first front portion 1011 thereof, and may be disposed adjacent to the side portion of the mobile terminal 100, that is, the first side portion 101a of the first frame. On the other hand, since the second side edge 151e is adjacent to the rear face of the mobile terminal 100 and the third rear portion 1022 of the second frame 102, the second side edge 151e may is be coupled the third rear portion 1022 of the second frame 102 to be movable in the first and second directions D1 and D2. In addition, since the display unit 151 is not structurally strong, a third frame 103 may be coupled to the second side edge 151e. The third frame 103 may be formed of a plate-shaped member extending in the longitudinal direction of the mobile terminal 100. Accordingly, the third frame 103 may be coupled to the second frame, that is, the third rear portion 1022 thereof to be movable in the first and second directions D1 and D2 instead of the second side edge 151e. In addition, the second frame 102 may include a slot 1025 extending in the lateral direction of the mobile terminal 100 or the second frame 102, that is, the direction perpendicular to the longitudinal direction thereof. Further, the third frame 103 may be stably moved while being guided by the slot 1025. The third frame 103 may include, for example, a projection inserted into the slot 1025 for the movement along the slot 1025.

Referring to FIGS. 3 to 5, in connection with such configuration of the first to third frames 101, 102, and 103, the display unit 151 may include a first area 1511 extending from one side thereof, that is, the first side edge 151d toward the second side edge 151e by a predetermined length, and a second area 1512 disposed opposite the first area 1511, and extending from the second side edge 151e toward the first side edge 151d by a predetermined length. In addition, the display unit 151 may include a third area 1513 disposed between the first and second areas 1511 and 1512. Such first to third areas 1511, 1512, and 1513 may be connected to each other, and may form a continuous body of the display unit 151. In addition, as described above, for the movement of the third area 1513 toward the front face or the rear face of the mobile terminal 100 depending on the moving direction of the second frame 102, the first area 1511 may be fixed so as not to move to the front face of the mobile terminal 100, and the second area 1512 may be provided to be movable on the rear face of the mobile terminal. Such configuration of the display unit 151 will be described in more detail below.

The first area 1511 may be disposed on the front face of the mobile terminal 100, more specifically, the first frame 101, that is, on the front face of the first front portion 1011. The first area 1511 is fixed to the first frame 101, that is, the front face of the first front portion 1011 so as not to be moved during the movement of the second frame 102, and thus, the first area 1511 may always be exposed to the front face of the mobile terminal 100. The third area 1513 may be adjacent to the first area 1511, and may extend into the second frame 102 and rolled on the roller 1028. The third area 1513 may consecutively extend out of the second frame 102 again and partially cover the second frame 102, that is, the rear face of the third rear portion 1022. Further, the second frame 102, that is, the third rear portion 1022, is adjacent to the first frame 101, that is, the second rear portion 1013 and together forms the rear case of the mobile terminal 100, so that it may be described that the third area 1513 is also disposed on the rear face of the first frame 101.

The second area 1512 may be adjacent to the third area 1513 and may be disposed on the rear face of the mobile terminal 100, more specifically, on the second frame, that is, the rear face of the third rear portion 1022 thereof. The second area 1512 may be coupled to the third frame 103 without being directly coupled to the second frame 102. As shown in FIG. 4(b), the slot 1025 extending in the lateral direction (i.e., the direction perpendicular to the longitudinal direction of the mobile terminal 100) to the second frame 102, that is, to the third rear portion 1022 is defined. Further, the third frame 103 may move along the slot 1025. In FIG. 4(b), it is shown that the slot 1025 is defined in the rear face of the second frame 102, but may be defined in the side face of the second frame 102. Although the second area 1512 may move in the first or second direction D1 or D2 with respect to the second frame 102 together with the third frame 103, the movement of the second area 1512 may be restricted within the rear face of the mobile terminal 100 by the slot 1025. That is, the second area 1512 does not move out of the second frame 102 even when the second frame 102 is extended or contracted, and may move along the slot 1025 within the second frame 102 by the extended or contracted distance of the second frame 102. Accordingly, the second area 1512 may always be exposed to the rear face of the mobile terminal 100.

As a result, the first area 1511 may be disposed on the front face of the mobile terminal 100 and may be always exposed to the front face regardless of the movement of the second frame 102, and the second area 1512 may be disposed on the rear face of the mobile terminal 100 and may be always exposed to the rear face regardless of the movement of the second frame 102. In addition, the third area 1513 may be disposed between the first and second areas 1511 and 1512, and may be selectively placed on the front face or the rear face of the mobile terminal 100 depending on the moving directions D1 and D2 of the second frame 102.

Because of such selective placement of the third area 1513, as shown in FIG. 4(b), the second rear portion 1013 of the first frame 101 is covered by the second and third areas 1512 and 1513 and the third rear portion 1022 of the display unit 151 in the first state, but the third area 1513 moves to the front face of the mobile terminal 100 in the second state, and the third rear portion 1022 also moves in the first direction D1, so that the mobile terminal 100 may be exposed to the outside. In addition, the second front portion 1021 of the second frame 102 is disposed below the first front portion 1011 of the first frame 101 in the first state, but is moved out of the first frame 101 and supports the third area 1513 of the display unit 151 disposed on the front face of the mobile terminal 100 in the second state.

Since the first and second areas 1511 and 1512 are always respectively arranged on the front face and the rear face of the mobile terminal 100, curvatures of the first area 1511 and the second area 1512 do not change, and the first area 1511 and the second area 1512 may be maintained in a flat basic state. However, the third area 1513 may be rolled on the roller 1028 and bent in the second frame 102. When converting from the first state to the second state, the third area 1513 may extend from the second frame 102 to the front face of the mobile terminal 100 while being rolled on the roller 1028 in one direction. On the other hand, when converting from the second state to the first state, the third area 1513 may be retracted from the front face of the mobile terminal 100 to the second frame 102 while being rolled on the roller 1028 in the opposite direction, and at the same time, may return to the rear face of the mobile terminal 100 from the second frame 102. A specific location of the foldable mobile terminal in a form of being spread like a book is easily damaged because only the specific location is folded repeatedly. On the other hand, the deformed portion of the flexible display unit 151, that is, a portion rolled on the roller 1028, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

As shown in FIGS. 3A, 4A, and 5A, the second frame 102 is fully retracted into the first frame 102 in the first state. Therefore, only the first area 1511 of the display unit 151 fixed to the front face of the first frame 101 may be exposed to the front face of the mobile terminal 100. Such first area 1511 may be fixed and supported to the first frame 101, that is, the first front portion 1011 thereof. In addition, a major portion of the third area 1513 may be disposed on the rear face of the mobile terminal 100 together with the second area 1512, and the third area 1513 may be disposed in the second frame 102 while being partially rolled on the roller 1028. The third area 1513 of the rear face of the mobile terminal 100 may be supported by the second frame, that is, the third rear portion 1022 thereof. The second area 1512 may be fixed by the third frame 103 disposed on the second frame (i.e., the third rear portion 1022) and may be movably coupled to the second frame 1012.

In such first state, when the second frame 102 moves in the first direction D1, the mobile terminal 100 may be converted into the second state. As shown in FIGS. 3B, 4B, and 5B, the second frame 102 may extend from the first frame 101 by the movement in the first direction D1, and may increase the overall size of the mobile terminal 100, in particular, the front face thereof. During the movement in the first direction D1, the second frame 102 may apply a force, that is, a tension, to the display unit 151 in the first direction D1. The display unit 151 is fixed to the first frame 101 but is coupled to the second frame 102 so as to be movable using the third frame 103, so that the force applied by the second frame 102 allows the third area 1513 to be rolled out from the roller 1028 of the second frame 102 to the front face of the mobile terminal 100. That is, the third area 1513 may be withdrawn (or pulled out) from the second frame 102 or extend to (or move out of) the second frame 102. At the same time, the third area 1513, particularly, the portion located on the rear face of the third area 1513 may be rolled into the roller 1028 of the second frame 102 from the rear face, or may be inserted (or pushed in), retracted, or moved into the second frame 102. Not an entirety of the third area 1513 is withdrawn from the second frame 102 to the front face of the mobile terminal 100, and a portion of the third area 1513 may be disposed in the second frame 102 while still being rolled on the roller 1028. In addition, for the smooth movement of the third area 1513, the second area 1512 may also move in the first direction D1 with respect to the second frame 102 together with the third frame 103. In addition, as described above, the second area 1512 and the third frame 103 may be constrained to the second frame 102 and move in the first direction D1 with respect to the first frame 101 together with the second frame 102. Accordingly, the second area 1512 and the third frame 103 may move in the first direction D1 relative to the first frame 101 as well as the second frame 102, and accordingly, move a distance longer than the moved distance of the second frame 102. Thus, because of such long distance movement in the first direction D1 of the second area 1512, the third area 1513 may be smoothly extended to the front face of the mobile terminal 100. Further, for the movement of the third area 1513, which is proportional to the expansion of the second frame 102, the movement of the second area 1512 and the third frame 103 in the first direction D1 may be performed simultaneously with the movement of such third area 1512 and second frame 102 in the first direction D1 so as to be proportional to the movement of third area 1513 and second frame 102.

When the second frame 102 is fully extended in the first direction D1, the first and third areas 1511 and 1513 may be arranged on the front face of the mobile terminal 100, and only the second area 1512 may be disposed on the rear face of the mobile terminal 100. Such first and third areas 1511 and 1513 may be supported by the first frame (i.e., the first front portion 1011 thereof) and the second frame (i.e., the second front portion 1021 thereof). In addition, the second frame 102, i.e., the third rear portion 1022 thereof exposes the second rear portion 1013 of the first frame while extending in the first direction D1, and supports the moving third area 1513. Therefore, in the second state, the mobile terminal 100 may have the extended front face display unit 151.

On the other hand, when the second frame 102 moves in the second direction D2 in the second state, the mobile terminal 100 may again return into the first state as shown in FIGS. 3A, 4A, and 5A. The second frame 102 may be contracted to the first frame 101 by the movement in the second direction D2, and may reduce the overall size of the mobile terminal 100, particularly the front face thereof. The movement of the display unit 151 during such movement of the second frame 102 may be performed in a reverse order of the movement in the first direction D1 described above. In brief, the third area 1513 may be rolled from the front face of the mobile terminal 100 into the roller 1028 of the second frame 102, or may be inserted, retracted, or moved into the second frame 102. At the same time, the third area 1513 may be rolled, withdrawn, extended, or moved out of the roller 1028 of the second frame 102 to the rear face of the mobile terminal 100. Not the entirety of the third area 1513 may be withdrawn from the second frame 102 to the rear face of the mobile terminal 100, and the portion of the third area 1513 may still be placed in the second frame 102 while still being rolled on the roller 1028. In addition, for such smooth movement of the third area 1513, the second area 1512 may also move in the second direction D2 with respect to the second frame 102 together with the third frame 103. The second area 1512 and the third frame 103 may be constrained to the second frame 102 to move in the second direction D2 with respect to the first frame 101 together with the second frame 102. Accordingly, the second area 1512 and the third frame 103 may move relatively in the second direction D2 with respect to not only the second frame 102 but also the first frame 101. As a result, the second area 1512 and the third frame 103 may move in the second direction D2 a distance larger than the moved distance of the second frame 102. Thus, because of such long distance movement of the second area 1512, the third area 1513 may be smoothly returned to the rear face of the mobile terminal 100. Further, for the movement of the third area 1513 proportional to the contraction of the second frame 102, the movements of the second area 1512 and the third frame 103 in the second direction D2 may be performed simultaneously with the movements of the third area 1512 and the second frame 102 in the second direction D2 to be proportional to the movements of the third area 1513 and the second frame 102. When the second frame 102 is completely contracted in the second direction D2, the mobile terminal 100 may be converted into the first state as described above, and may have the display unit 151 with the front face that is relatively reduced in comparison with the second state in the first state.

Figure 6:
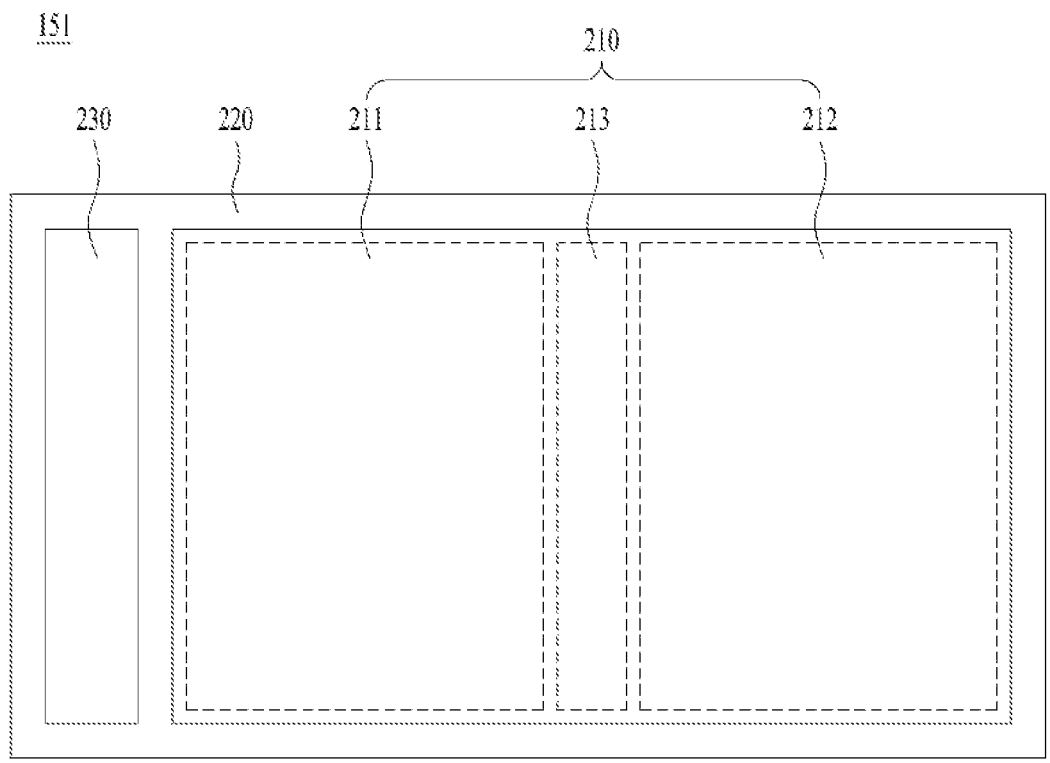
FIG. 6 shows a flexible display panel 151 according to one embodiment.
Figure 7:
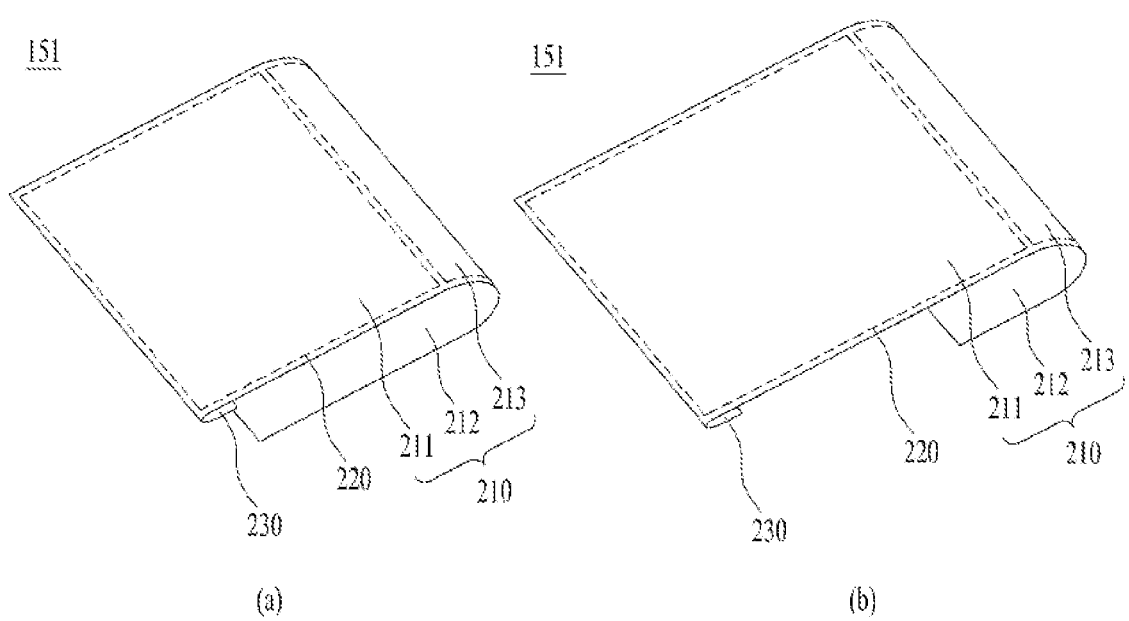
FIG. 7 shows a first state ((a) in FIG. 7) and a second state ((b) in FIG. 7) of a flexible display panel 151 in FIG. 6.

FIG. 6 shows the flexible display panel 151 according to one embodiment. FIG. 7 shows a first state ((a) in FIG. 7) and a second state ((b) in FIG. 7) of the flexible display panel 151 in FIG. 6.

The flexible display 151 according to an embodiment may include an active area 210 on which an image is output and a non-active area 220 disposed around the active area 210. The non-active area 220 may form a bezel at an edge of the active area 210. In addition, the non-active area 220 may include a driver 230 for applying a signal for outputting the image to the active area 210 and a circuit configuration.

In the flexible display 151 according to an embodiment, the active area 210 may be divided into a first active area 211, a second active area 212, and a third active area 213. The first active area 211 may be an area exposed in a direction of the front face of the mobile terminal in the active area 210. The second active area 212 may be an area exposed in a direction of the rear face of the mobile terminal in the active area 210. The third active area 213 as an area defined between the first active area 211 and the second active area 212 may correspond to a portion surrounding the first roller 1028 in FIG. 5.

In the flexible display 151 according to an embodiment, sizes of the first active area 211 and the second active area 212 may vary depending on a state of the mobile terminal. For example, while the state of the mobile terminal changes from the first state ((a) in FIG. 7) to the second state ((b) in FIG. 7), the first active area 211 may become smaller and the second active area 212 may become larger. Conversely, while the state of the mobile terminal changes from the second state ((b) in FIG. 7) to the first state ((a) in FIG. 7), the first active area 211 may become larger and the second active area 212 may become smaller. In this regard, the third active area 213 may only move based on the change in the state, and may be fixed in size.

The flexible display 151 according to one embodiment may be disposed in the mobile terminal such that an area with the driver 230 is disposed on a rear face of the first active area 211, as shown in (a) in FIG. 7. The driver 230 may be mounted in the non-active area 220 in a chip on film scheme. The driver 230 may be a component included in the controller 180 shown in FIG. 1 or a component connected to the controller 180.

The flexible display 151 according to an embodiment may include a circuit configuration for applying a signal from the driver 230 to the active area 210 in the non-active area 220.

Figure 8:
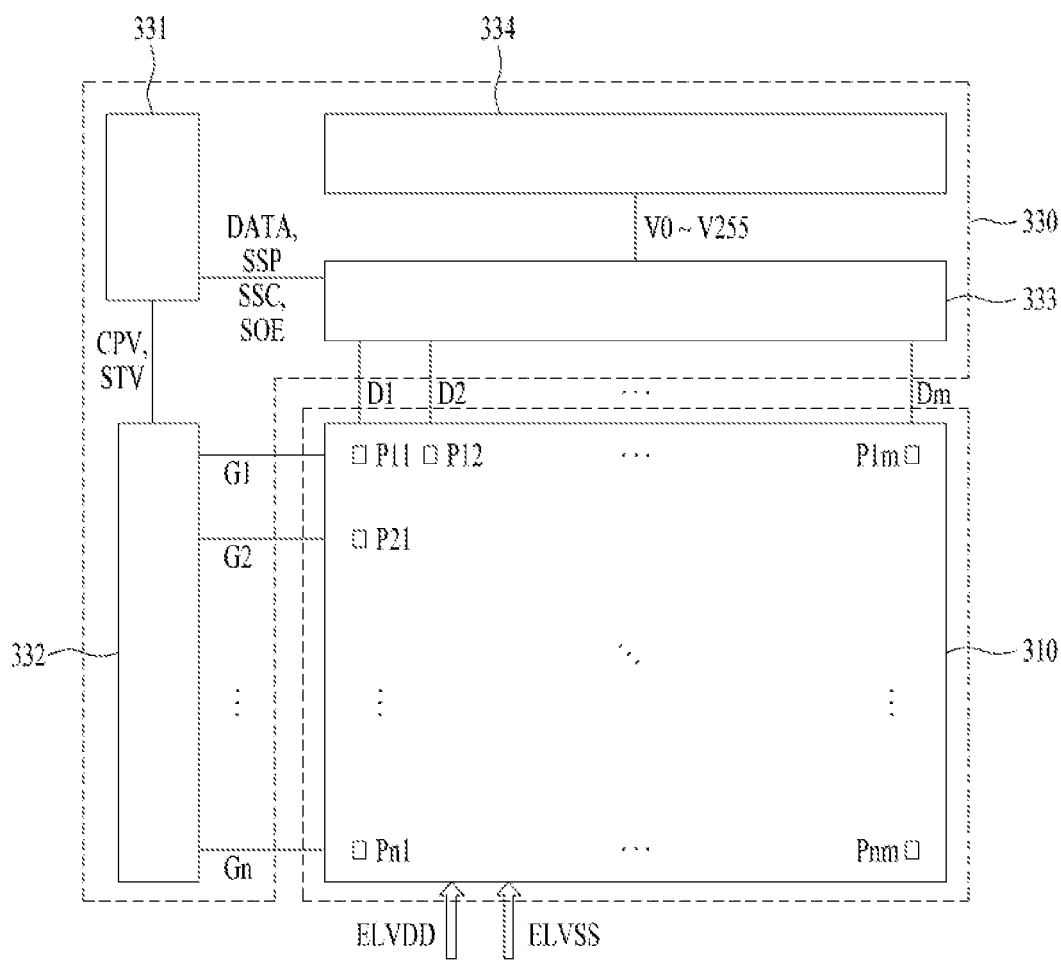
FIG. 8 shows a circuit configuration of a flexible display 151 according to one embodiment.

FIG. 8 shows the circuit configuration of the flexible display 151 according to one embodiment.

The flexible display 151 according to an embodiment may include a pixel array 310 corresponding to the active area 210 in FIG. 6 and a display controller 330 corresponding to the driver 230.

The pixel array 310 according to one embodiment may include pixels P11 to Pnm positioned at intersections of gate lines G1 to Gn and data lines D1 to Dm. Each of the pixels P11 to Pnm may be arranged in an m*n matrix form as shown in FIG. 8. Each of the pixels P11 to Pnm may include a light emitting element, and may receive a power supply voltage ELVDD and a base voltage ELVSS for emitting light from the light emitting element (an organic light emitting diode). Each of the pixels P11 to Pnm may supply a driving current or a voltage to the light emitting element to emit light with a luminance corresponding to a data voltage.

Each of the pixels P11 to Pnm according to an embodiment may control an amount of current supplied to the light emitting element in response to the data voltage transmitted via the data lines D1 to Dm, and the light emitting element may emit light having the luminance corresponding to the data voltage.

The display controller 330 according to an embodiment may include a timing controller 331 for generating control signals and outputting the control signals to a gate driver 332 and a data driver 333, the gate driver 332 for applying a driving signal to each of the plurality of pixels P11 to Pnm via the gate lines G1 to Gn, the data driver 333 for applying a data voltage corresponding to an input image to each of the plurality of pixels P11 to Pnm via the data lines D1 to Dm, and a gray scale voltage generator 150 for generating a plurality of gray scale voltages V0 to V255 and supplying the plurality of gray scale voltages V0 to V255 to the data driver 333.

The timing controller 331 according to an embodiment receives an input image signal and an input control signal for controlling display of the signal from an external graphic controller (not shown). The timing controller 331 generates a gate driving click CPV, a start pulse (STV), and the like, and outputs them to the gate driver 332. In addition, the timing controller 331 generates input image data DATA, a source start pulse SSP, a source shift click SSC, a source output enable SOE, and the like from the input image signal and the image control signal and outputs them to the data driver 333.

The gate driver 332 according to an embodiment generates a driving signal using the gate driving click CPV, the start pulse STV, and the like input from the timing controller 331, and outputs the driving signal to each of the pixels P11 to Pnm via the gate lines G1 to Gn.

The gate driver 332 according to an embodiment may perform an operation of outputting a light emission control signal to a plurality of light emission control lines (not shown) connected to the plurality of pixels P11 to Pnm as well as to the gate lines G1 to Gn. That is, the gate driver 332 may sequentially or simultaneously output the driving signals and the light emission control signals in units of rows via the gate lines G1 to Gn and the light emission control lines (not shown).

Figure 9:
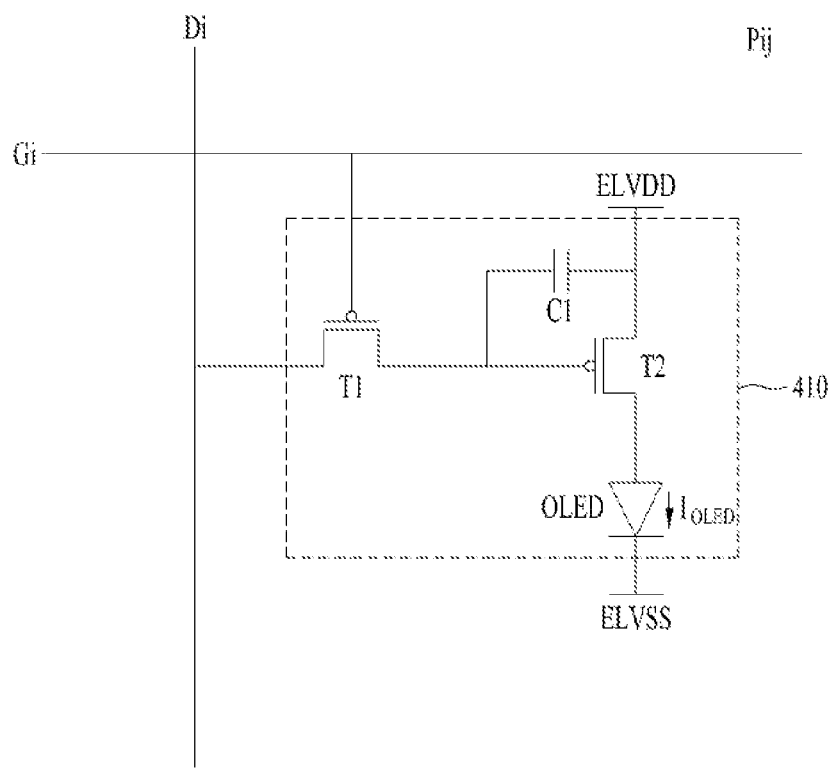
FIG. 9 shows one embodiment of a circuit configuration of a pixel Pij shown in FIG. 8.

FIG. 9 shows one embodiment of a circuit configuration of a pixel Pij shown in FIG. 8.

The pixel Pij according to one embodiment as a light emitting element may include an organic light emitting diode (OLED) and a pixel circuit 410.

The organic light emitting diode (OLED) according to one embodiment may receive a driving current I_OELD output from the pixel circuit 410 and emit light, and a luminance of the light emitted from the organic light emitting diode (OLED) may vary depending on a magnitude of the driving current I_OLED.

The pixel circuit 410 according to one embodiment may include a capacitor C1, a first transistor T1, and a second transistor T2. The first transistor T1 may include a first terminal connected to a data line Di, a second terminal connected to a gate terminal of the second transistor T2, and a gate terminal connected to a gate line Gi. The second transistor T2 may include a first terminal supplied with the power supply voltage ELVDD, a second terminal connected to an anode of the organic light emitting diode (OLED), and a gate terminal connected to a second terminal of the first transistor T1. A cathode of the organic light emitting diode (OLED) may be connected to the base voltage (ELVSS). In this regard, the capacitor C1 of the pixel circuit 410 may be connected to the first terminal and the gate of the second transistor T2.

The organic light emitting diode (OLED) according to an embodiment may emit light in response to the driving current I_OLED generated by the second transistor T2. Specifically, when the driving signal is applied to the first transistor via the gate line Gi, the data signal may be transmitted to the gate terminal of the second transistor T2 and the capacitor C1 via the first transistor T1. While a valid data signal is applied via the data line Dj, a voltage of a level corresponding to the data signal may be charged in the capacitor C1 to uniformly control the driving current I_OLED applied to the organic light emitting diode (OLED).

Figure 10:
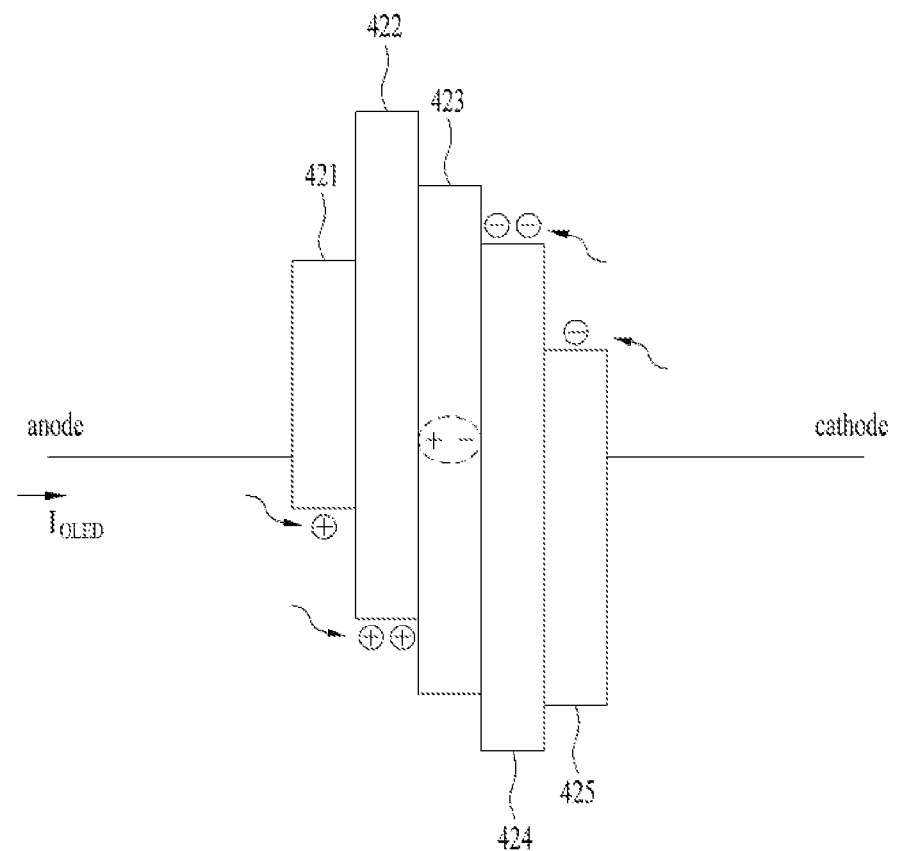
FIG. 10 shows one embodiment of an organic light emitting diode (OELD) included in FIG. 9.

FIG. 10 shows one embodiment of an organic light emitting diode (OELD) included in FIG. 9.

The organic light emitting diode (OLED) according to one embodiment may include organic compound layers 421 to 425 formed between an anode, which is a pixel electrode, and a cathode, which is a common electrode. The organic compound layers 421 to 425 may include a hole injection layer 421, a hole transport layer 422, a light emitting layer 423, an electron transport layer 424, and an electron injection layer 425.

In the organic light emitting diode (OLED) according to one embodiment, when a driving voltage is applied to the anode and the cathode, holes that have passed through the hole transport layer 422 and electrons that have passed through the electron transport layer 424 may move to the light emitting layer 423 to form excitons. As a result, the light emitting layer 423 may emit visible light.

Figure 11:
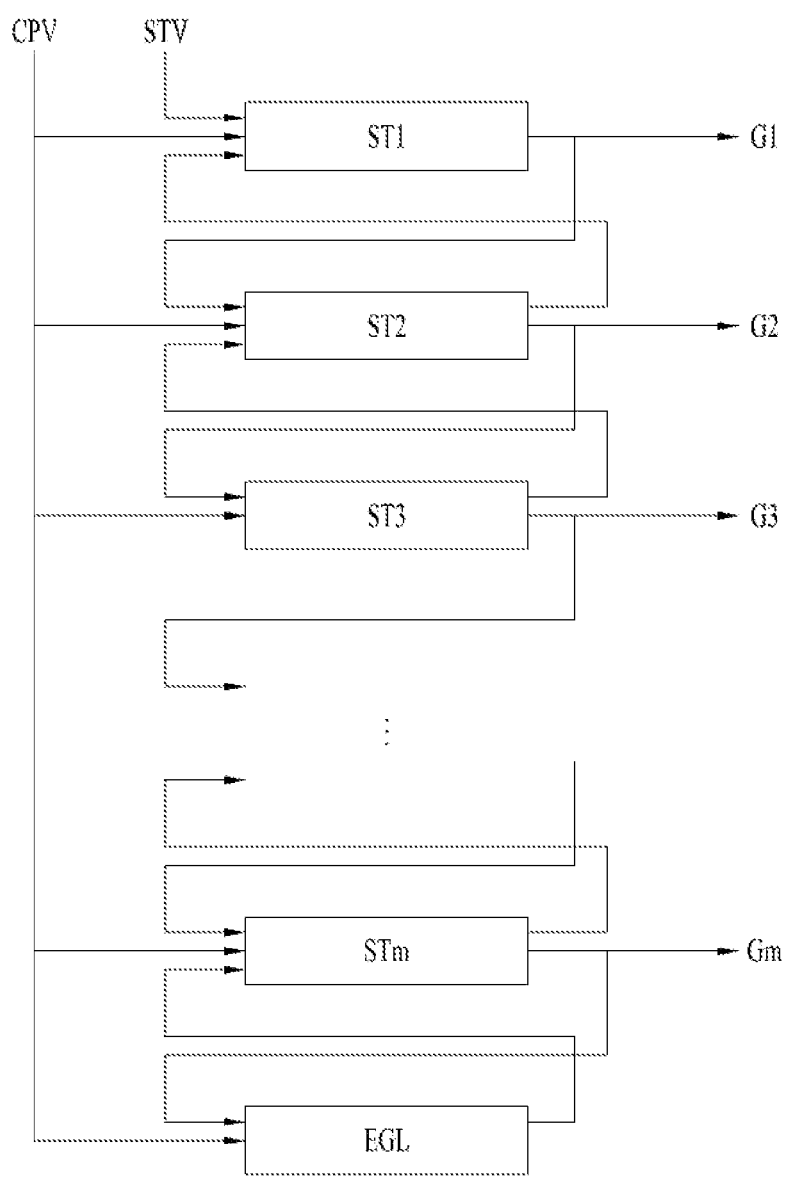
FIG. 11 shows one embodiment of a circuit configuration of a gate driver 332 included in FIG. 8.

FIG. 11 shows one embodiment of a circuit configuration of a gate driver 332 included in FIG. 8.

The gate driver 332 according to one embodiment may include a gate in panel (GIP) circuit shown in FIG. 11. The GIP driving circuit may constitute a shift register, and the shift register may include a plurality of subordinately connected stages SL1 to SLn.

The gate driver 332 according to one embodiment is composed of the stages ST1 to STn that sequentially output the driving signals by shifting the start pulse STV based on the gate driving click CPV.

Figure 14:
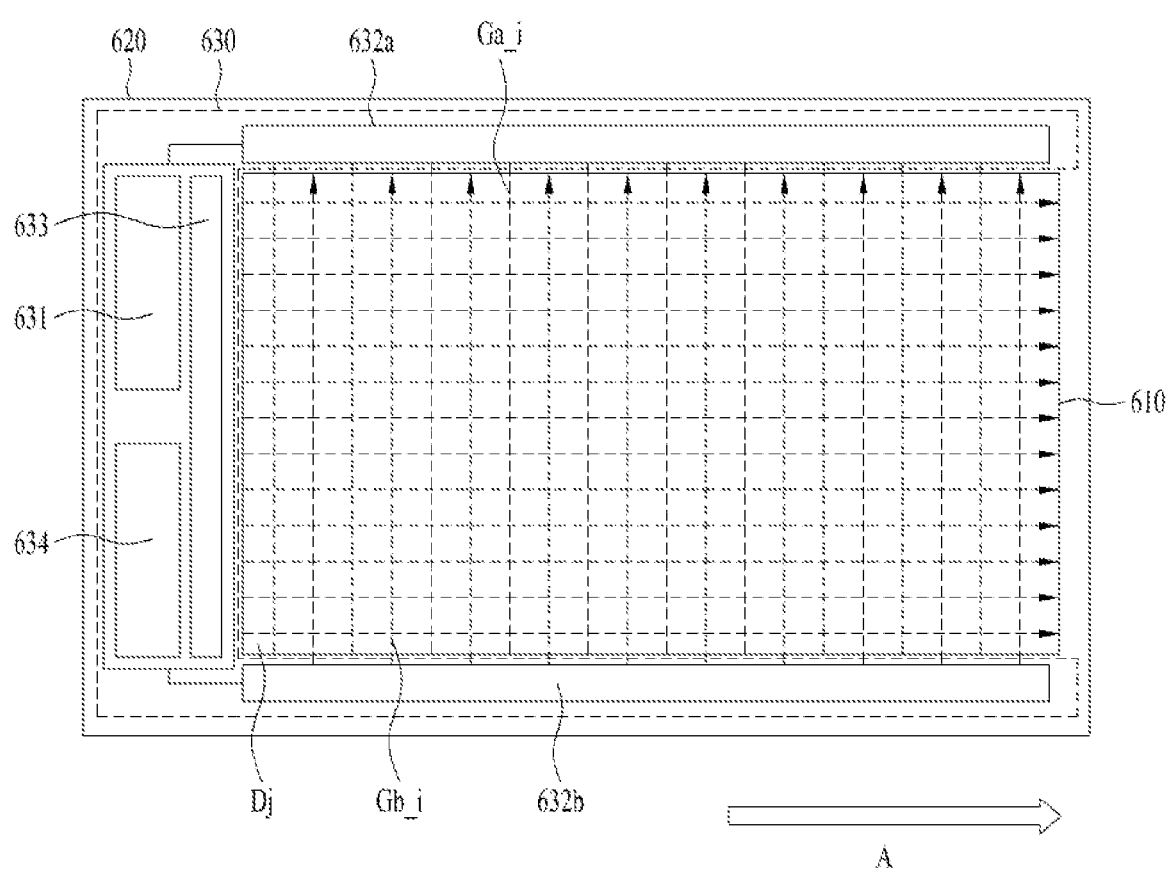
FIG. 14 shows one embodiment of the flexible display panel 151 including one driver 630.

The GIP driving circuit of the gate driver 332 according to one embodiment may be disposed at both edges of the flexible display panel 151 as shown in FIG. 14. When the GIP driving circuit is divided and disposed at the both edges, a width of the bezel on both sides of the active area 210 may be reduced. However, the GIP driving circuit of the gate driver 332 may be disposed at one edge of the flexible display panel 151.

The GIP driving circuit according to one embodiment may include the plurality of stages ST1 to STn to which the gate driving click CPV and the start pulse STV are input. Each of the stages ST1 to STn generates an output in response to the start pulse STV and shifts the output based on the gate driving click CPV.

The gate driver 332 according to one embodiment includes the plurality of subordinately connected stages ST1 to STn (where n is a natural number equal to or greater than 2). Each of the stages ST1 to STn outputs the driving signal via each of the gate lines G1 to Gn. In this regard, the gate signal may correspond to a gate voltage or a gate pulse. The gate signal may be applied to the pixel Pij and transmitted to a front stage and a rear stage at the same time.

The stages ST1 to STn of the gate driver 332 according to one embodiment start outputting the driving signals in response to the start pulse STV and shift the driving signals in response to the gate driving click CPV.

Figure 12:
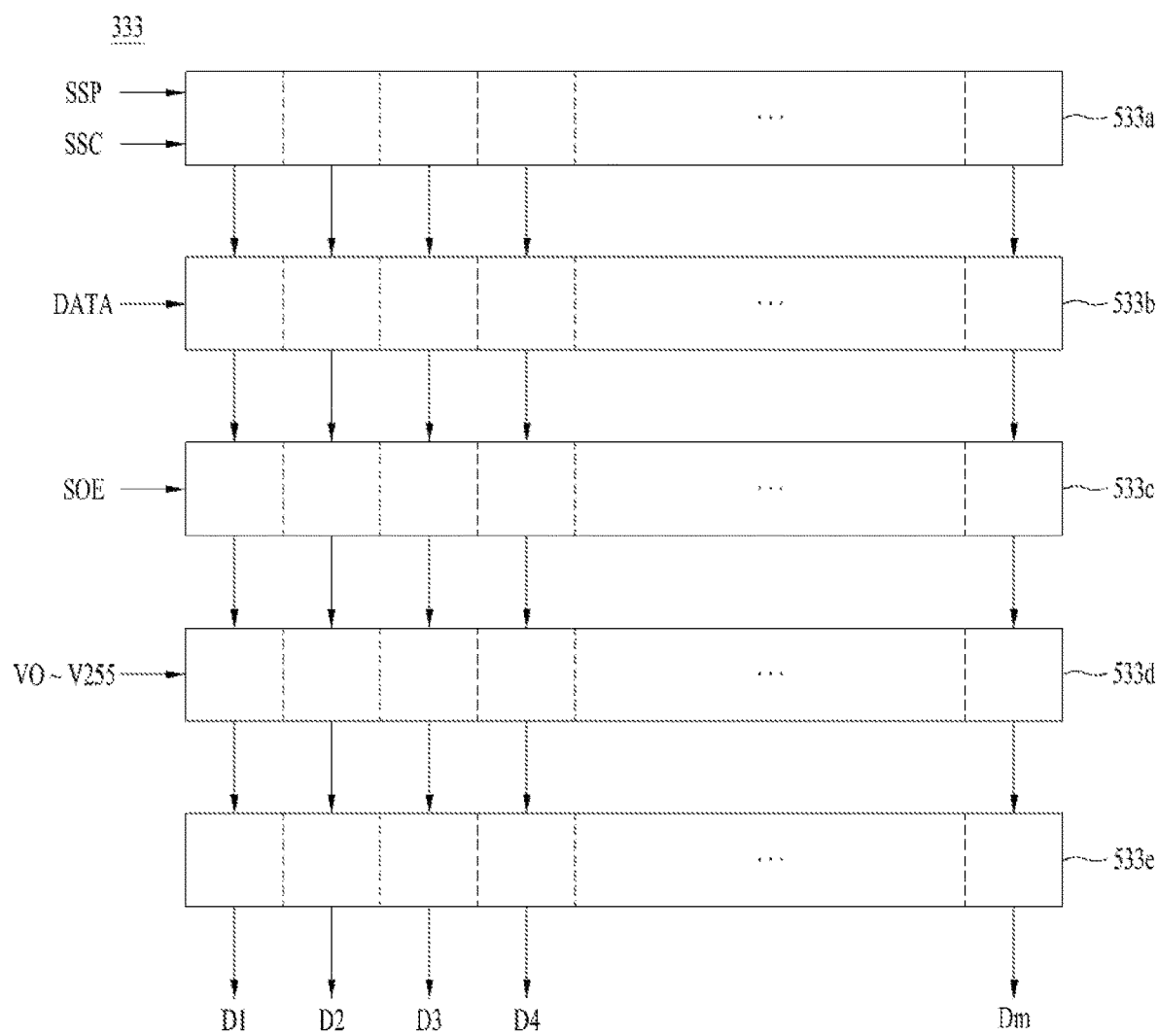
FIG. 12 shows one embodiment of a circuit configuration of a data driver 333 included in FIG. 8.

FIG. 12 shows one embodiment of a circuit configuration of a data driver 333 included in FIG. 8.

The data driver 333 according to one embodiment includes a shift register unit 533a, a sampling latch unit 533b, a holding latch unit 533c, a digital-analog converter unit (DAC unit) 533d, and a buffer unit 533e.

The shift register unit 533a according to one embodiment receives the source start pulse SSP and the source shift click SSC from the timing controller 331. The shift register 533a receiving the source shift click SSC and the source start pulse SSP sequentially generates m sampling signals while shifting the source start pulse SSP for each cycle of the source shift click SSC. To this end, the shift register unit 533a includes m shift registers.

The sampling latch unit 533b according to one embodiment sequentially stores the input image data DATA in response to the sampling signals sequentially supplied from the shift register unit 533a. To this end, the sampling latch unit 533b includes m sampling latches to store the m input image data DATA.

The holding latch unit 533c according to one embodiment receives the source output enable (SOE) signal from the timing controller 331. The holding latch unit 533c receiving the source output enable (SOE) signal receives the input image data DATA from the sampling latch unit 533b and stores the input image data DATA. In addition, the holding latch unit 533c supplies the input image data DATA stored therein to the DAC unit 533d. To this end, the holding latch unit 533c has m holding latches.

The DAC unit 533d according to one embodiment receives the input image data DATA from the holding latch unit 533c and receives gray scale voltages V0 to V255 from a gray scale voltage generator 334 to generate m data voltages in response to the input image data DATA and supply the generated data voltages to the buffer unit 533e.

The buffer unit 533e according to an embodiment supplies the m data voltages supplied from the signal generator 533d to the m data lines D1 to Dm, respectively. To this end, the buffer unit 533e includes m buffers.

Figure 13:
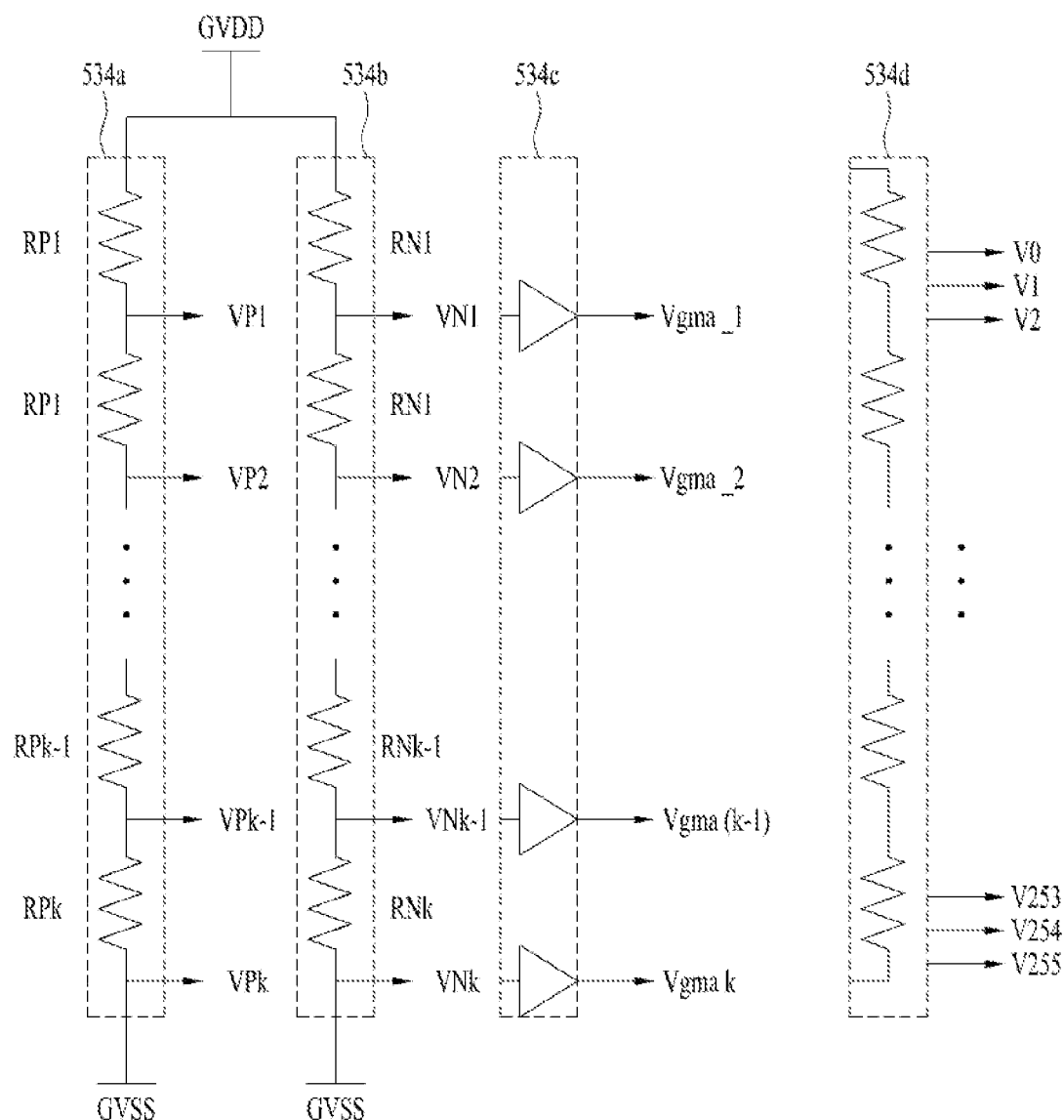
FIG. 13 shows one embodiment of a circuit configuration of a gray scale voltage generator included in FIG. 8.

FIG. 13 shows one embodiment of a circuit configuration of a gray scale voltage generator 334 included in FIG. 8.

The gray scale voltage generator 334 according to one embodiment may generate the plurality of gamma-corrected gray scale voltages V0 to V255 and output the generated gray scale voltages to the data driver 333. The plurality of gray scale voltages V0 to V255 may vary based on the number of gray scales expressed on the flexible display 151. In the embodiment of the present disclosure, a description is made on the basis that the gray scale expressed in the flexible display 151 is a 256-level gray scale, but the embodiment of the present disclosure is not necessarily limited thereto.

The gray scale voltage generator 334 according to an embodiment may include a positive gamma unit 534a and a negative gamma unit 534b connected in parallel between a power supply voltage GVDD and a base voltage GVSS, a buffer unit 534c, and a distribution unit 534d.

Each of the positive gamma unit 534a and the negative gamma unit 534b includes each of a group of a plurality of positive resistances RP1 to RPk and a group of a plurality of negative resistances RN1 to RNk connected in series between the power supply voltage GVDD and the base voltage GVSS. With such configuration, in each of the positive gamma unit 534a and the negative gamma unit 534b, the power supply voltage GVDD is divided by the resistances of each of the group of the plurality of positive resistances RP1 to RPk and the group of the plurality of negative resistances RN1 to RNk to generate k positive voltages VP1 to VPk or k negative gamma voltages VN1 to VNk.

The buffer unit 534*c* outputs the positive gamma voltages VP1 to VPk and the negative gamma voltages VN1 to VNk generated by the positive gamma unit 534*a* and the negative gamma unit 534*b* in a predetermined order. Such buffer unit 534*c* serves to suppress output fluctuations of output gamma voltages VGna_1 to VGna_k.

The distribution unit 534*d* may generate the plurality of gray scale voltages V0 to V255 respectively representing voltage levels of the gray scale via voltage division of output gamma voltages Vgma_1 to Vgma_k output from the buffer unit 534*d*. The distribution unit 534*d* includes a resistance column in which a plurality of resistances are connected to each other in series. The plurality of output gamma voltages Vgma_1 to Vgma_k may be applied to some of nodes of the resistance column, and the applied output gamma voltages Vgma_1 to Vgma_k may be divided by the resistances to be output as the plurality of gray scale voltages V0 to V255. The plurality of gray scale voltages V0 to V255 may be provided to the data driver 333 (see FIG. 8), and a voltage corresponding to the data signal of each pixel may be selected among the plurality of gray scale voltages V0 to V255.

FIG. 14 shows one embodiment of the flexible display panel 151 including one driver 630.

The flexible display panel 151 according to one embodiment may control an image output in an active area 610 using one driver 630. In this regard, the driver 630 and the active area 610 may correspond to the driver 230 and the active area 610 in FIG. 6, respectively. In addition, the driver 630 and the active area 610 may correspond to the display controller 330 and the pixel array 310 in FIG. 8, respectively. Specifically, the driver 630 may be disposed in the non-active area 620 separated from the active area 610.

The driver 630 according to one embodiment may include a timing controller 631, a data driver 633, and a gray scale voltage generator 634 at one edge of the flexible display panel 151. In this case, the flexible display panel 151 may include gate drivers 632*a* and 632*b* at both edges with said one edge interposed therebetween. When the gate drivers 632*a* and 632*b* are respectively disposed at the both edges, a thickness of the bezel formed at each of the both edges may be reduced.

The flexible display panel 151 according to an embodiment may include the gate drivers 632*a* and 632*b* at the both edges directed parallel to a first direction A. A first gate line Ga_i along which a driving signal output from the first gate driver 632*a* passes and a second gate line Gb_i along which a driving signal output from the first gate driver 632*b* passes may intersect each other in the active area 610.

The flexible display panel 151 according to an embodiment may be formed long in the first direction A. In this regard, the first direction A may correspond to a direction in which the flexible display panel 151 is folded as shown in FIG. 7.

When the flexible display panel 151 is formed long in the first direction A, following problems may occur. First, in order to generate a driving voltage generated at an end point in the first direction A to be the same as a driving voltage generated at a starting point in the first direction A, a voltage provided via the timing controller 631 may be increased. In the voltage transferred to the end point in the first direction A, a voltage drop may occur due to an internal resistance and the like of a conducting wire. Accordingly, the voltage provided via the timing controller 631 may be required to be higher as the flexible display panel 151 is formed longer in the first direction A. Second, a large amount of power may be consumed as the driving voltage is uniformly applied to the wider screen area A. Third, in response to the increasing number of gate lines along the first direction A, the thickness of the bezel required for each of the both edges disposed along the first direction A may increase.

Figure 15:
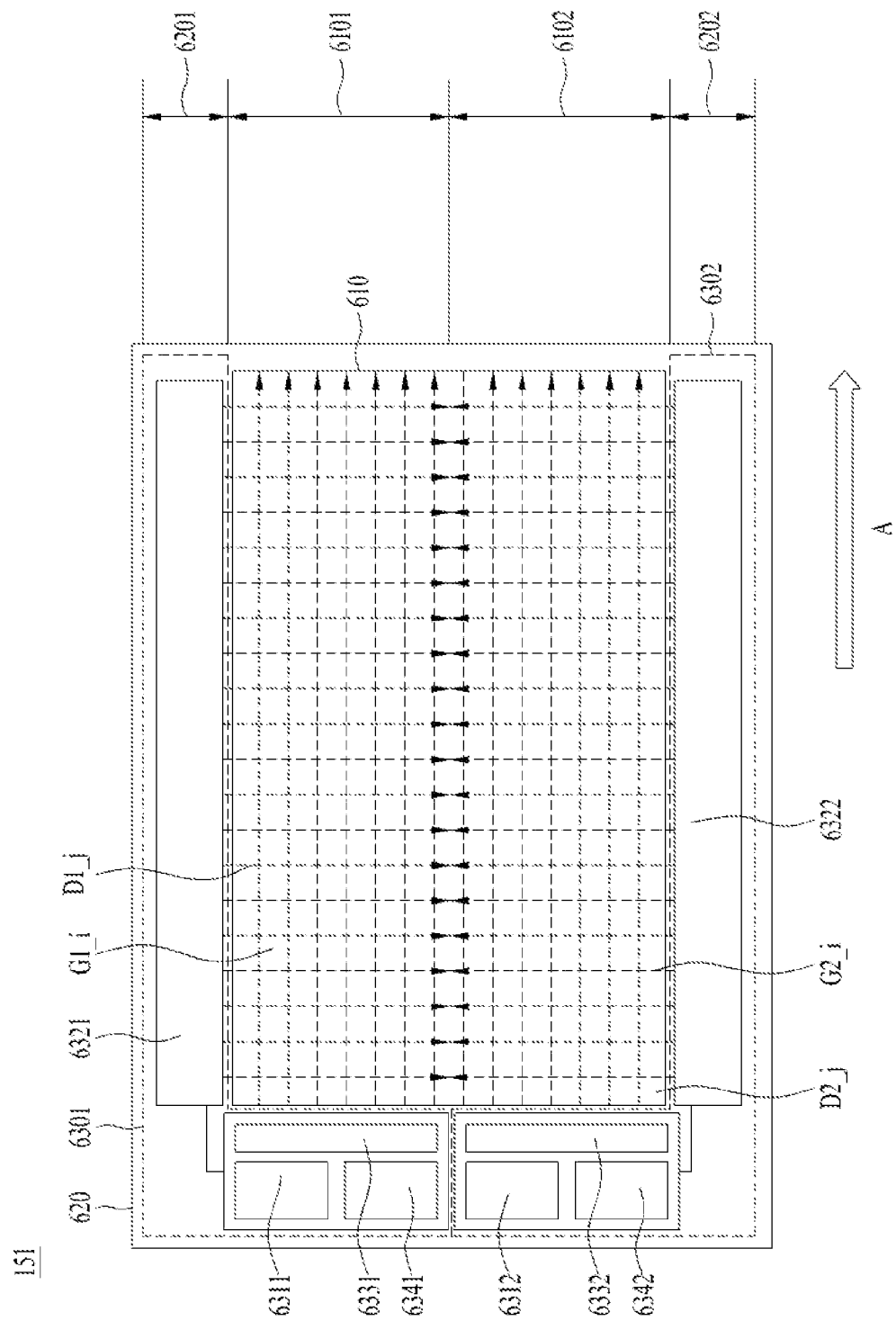
FIG. 15 shows one embodiment of a flexible display panel 151 including two drivers.

FIG. 15 shows one embodiment of a flexible display panel 151 including two drivers 6301 and 6302.

The flexible display panel 151 according to one embodiment may include a first driver 6301 and a second driver 6302.

The active area 610 may be divided into a fifth active area 6101 and a sixth active area 6102. The first driver 6301 may control an image signal output from the fifth active area 6101. The second driver 6302 may control an image signal output from the sixth active area 6102.

When the first direction A in FIG. 15 is viewed as a right direction, the flexible display panel 151 according to one embodiment may distinguish an upper area of the active area 610 as the fifth active area 6101 and distinguish a lower area of the active area 610 as the sixth active area 6102. The first driver 6301 may control the image signal output from the fifth active area 6101. The second driver 6302 may control the image signal output from the sixth active area 6102.

The first driver 6301 may drive pixels (not shown) included in the fifth active area 6101 via third gate lines G1_i, and may provide the image signal to the pixels (not shown) included in the fifth active area 6101 via third data lines D1_j. Similarly, the second driver 6302 may drive pixels (not shown) included in the sixth active area 6102 via fourth gate lines G2_i, and may provide the image signal to the pixels (not shown) included in the sixth active area 6102 via fourth data lines D2_i.

The first driver 6301 may include a first timing controller 6321, a first gate driver 6321, a first data driver 6331, and a first gray scale voltage generator 6341. The first driver 6301 may be disposed in portions on the left side of and above the fifth active area 6101. Specifically, the first timing controller 6321 and the first data driver 6331 may be disposed in the portion on the left side of the fifth active area 6101, and the first gate driver 6321 may be disposed in the portion above the fifth active area 6101. The first gate driver 6321 may be disposed at an upper bezel 6201 of the flexible diffuser panel 151.

The second driver 6302 may include a second timing controller 6312, a second gate driver 6322, a second data driver 6332, and a second gray scale voltage generator 6342. The second driver 6302 may be disposed on portions on the left side of and below the sixth active area 6102. Specifically, the second timing controller 6322 and the second data driver 6332 may be disposed in the portion on the left side of the sixth active area 6102, and the second gate driver 6322 may be disposed in the portion below the sixth active area 6102. The second gate driver 6332 may be disposed at a lower bezel 6202 of the flexible display panel 151.

Figure 16:
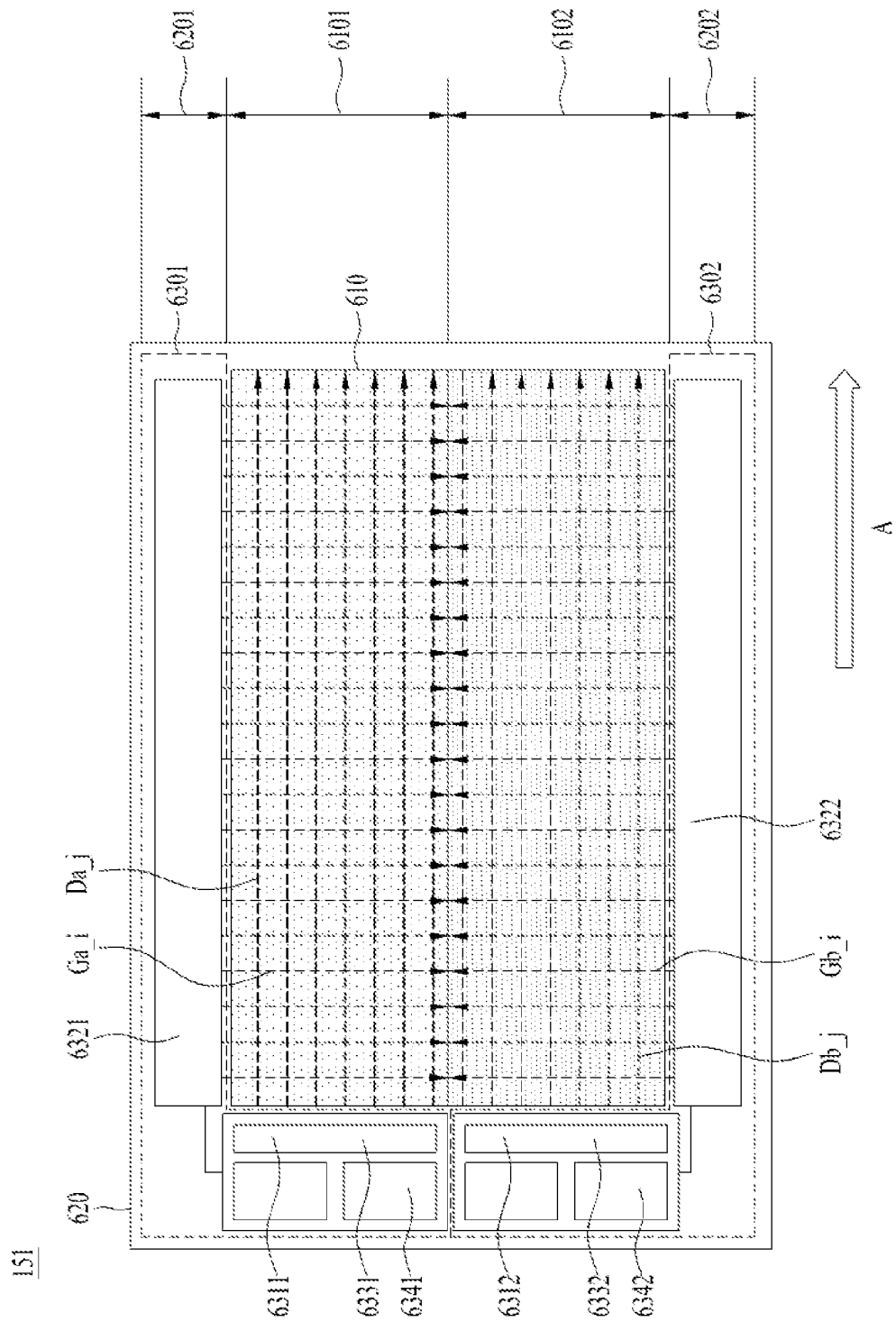
FIG. 16 shows one embodiment in which a luminance deviation occurs between active areas divided in FIG. 15.
Figure 17:
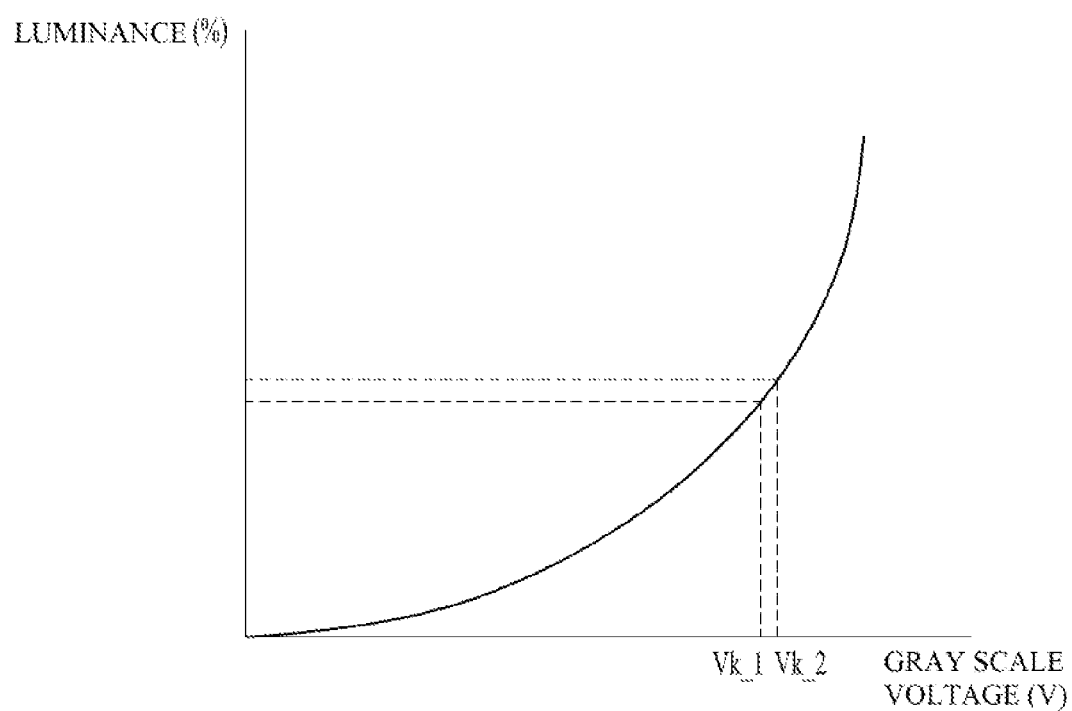
FIGS. 17 and 18 are diagrams for illustrating a cause of an occurrence of a luminance deviation in FIG. 16.
Figure 18:
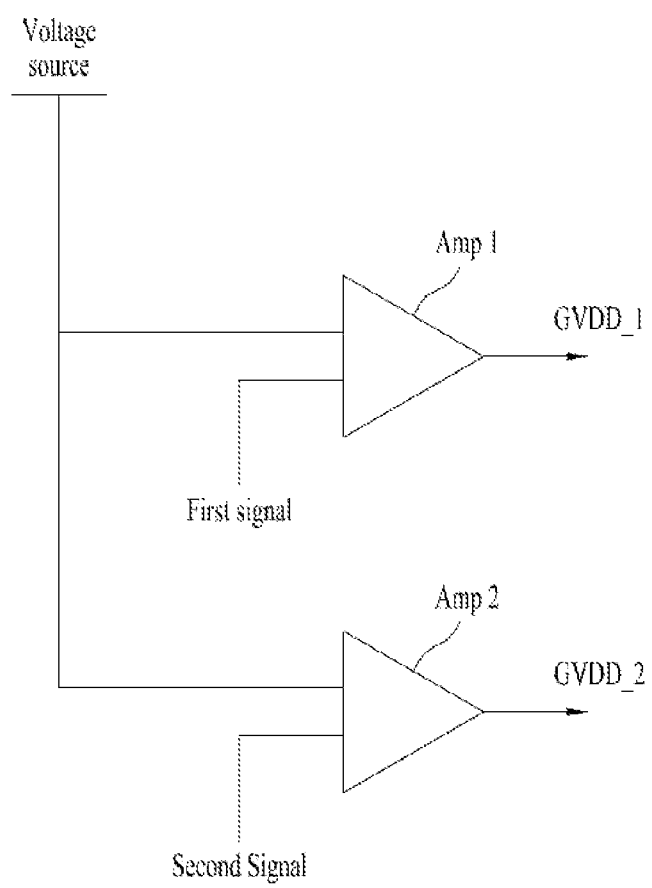

FIG. 16 shows one embodiment in which a luminance deviation occurs between the active areas divided in FIG. 15, and FIGS. 17 and 18 are diagrams for illustrating a cause of the occurrence of the luminance deviation in FIG. 16.

The display panel 151 according to one embodiment may control the image output from the active area 610 with the two drivers 6301 and 6302. Specifically, the first driver 6301 may control the image output from the first active area 6101 of the active area 610, and the second driver 6302 may control the image output from the second active area 6102 of the active area 610.

The first active area 6101 and the second active area 6102 may respectively correspond to both opposing divided areas of the active area 610. The image output from the first active area 6301 and the image output from the second active area 6302 may be one connected image.

The image output from the first active area 6101 may be controlled by an image signal provided via the first data driver 6331 of the first driver 6301. Specifically, the image output from the first active area 6101 may be controlled as the first data driver 6331 applies the image signal to pixels included in the first active area 6101 via first data lines Da_j.

Similarly, the image output from the second active area 6102 may be controlled by an image signal provided via the second data driver 6332 of the second driver 6302. Specifically, the image output from the second active area 6102 may be controlled as the second data driver 6332 applies the image signal to pixels included in the second active area 6102 via second data lines Db_j.

The first data lines Da_j may form a group and the second data lines Db_j may form a group and the groups may be dividedly disposed in the active area 610. For example, when the active area 610 includes pixels of an m*n matrix, the image signal may be applied to pixels included in rows 1 to k by the first data lines Da_j, and the image signal may be applied to pixels included in rows k+1 to m by the second data lines Db_j. In this case, the first active area 6101 may be an area including the pixels included in the rows 1 to k, and the second active area 6102 may be an area including the pixels included in the rows k+1 to m.

However, when the group of the data lines Da_j and the group of the data lines Db_j are divided in the active area 610 as described above, due to a luminance deviation that occurs between the images output from the first active area 6101 and the second active area 6102, there may be a problem in that the user recognizes a boundary between the first active area 6101 and the second active area 6102. That is, as shown in FIG. 16, an output brightness of one color output from the active area 610 may vary in the first active area 6101 and the second active area 6102, so that the user may recognize the boundary between the first active area 6101 and the second active area 6102.

The luminance as a concept that indicates a brightness level of a display device may be utilized as an important indicator of a display performance because, the brighter the screen, the more clearly the image on the screen may be clearly viewed even under the sunlight outdoors. A gray scale, which is related to the luminance, expresses differences in color tone in levels. The gray scale may express the color from the brightest tone to the darkest tone. Gamma is a number that determines a correlation between a gray scale of the signal input to the display and a luminance of the image displayed on the screen. Depending on a gamma value, there may be differences in the displayed color tone even on the same screen.

FIG. 17 shows a relationship between the luminance and the gray scale voltage with respect to a specific gamma value (e.g., 2.2). In this regard, the gray scale voltage may correspond to the gray scale voltage V0 to V225 provided by the gray scale voltage generator 334 shown in FIG. 13. That is, when a gray scale voltage provided by the first gray scale voltage generator 6341 to the first data driver 6331 is different from a gray scale voltage provided by the second gray scale voltage generator 6342 to the second data driver 6341, a luminance of a color may vary in the first active area 6101 and the second active area 6102.

The gray scale voltages respectively generated by the first gray scale voltage generator 6341 and the second gray scale voltage generator 6342 may be output differently for various reasons even when the same voltage is applied. In some cases, the difference may occur due to a difference in the applied voltage.

First, because the first gray scale voltage generator 6341 and the second gray scale voltage generator 6342 are implemented on different semiconductors, even when the same voltage is applied, there may be a slight difference in the output gray scale voltage.

Second, the voltages applied to the first gray scale voltage generator 6341 and the second gray scale voltage generator 6342 may be slightly different. FIG. 18 is a circuit diagram showing a process of providing driving voltages to the first gray scale voltage generator 6341 and the second gray scale voltage generator 6342 from the same voltage source using different amplifiers Amp 1 and Amp 2. A magnitude of the driving voltage applied to the first gray scale voltage generator 6341 may be determined by a first signal, and a magnitude of the driving voltage applied to the second gray scale voltage generator 6342 may be determined by a second signal. The first signal and the second signal are signals output from different output terminals, and may be generated by, for example, the first timing controller 6311 and the second timing controller 6312, respectively. Because the first signal and the second signal are output from the different output terminals, the magnitudes of the signals may be slightly different from each other. Alternatively, the driving voltages applied to the first gray scale voltage generator 6341 and the second gray scale voltage generator 6342 may be different due to differences in the amplifiers themselves.

That is, due to the above reasons or other reasons that may be additionally considered, when the image is divided into the two images and the two images are output on the screen with the two drivers 6301 and 6302, the user may recognize the boundary between the divided areas due to the difference in the luminance between the divided screen areas.

Figure 19:
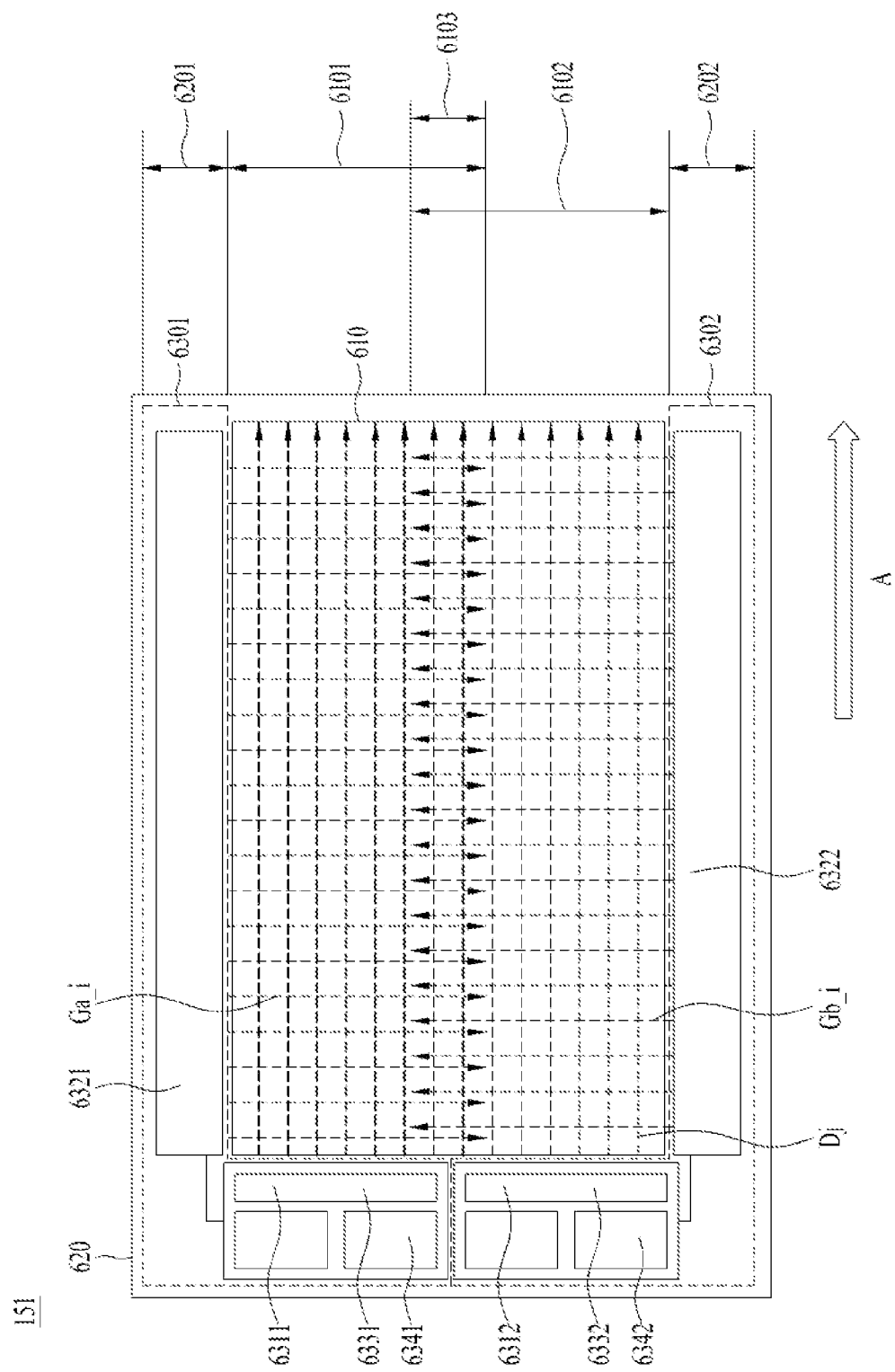
FIG. 19 shows one embodiment of an arrangement of data lines that prevents a user from recognizing a luminance deviation occurring between divided active areas.

FIG. 19 shows one embodiment of an arrangement of data lines that prevents a user from recognizing a luminance deviation occurring between divided active areas. Hereinafter, differences from the configuration in FIG. 16 will be mainly described.

In the display panel 151 according to one embodiment, in order to prevent the user from recognizing the boundary between the first active area 6301 and the second active area 6302 due to the luminance deviation, the first data lines Da_j and the second data lines Db_j may be alternately disposed in at least one area of the active area 610.

Specifically, the mobile terminal according to one embodiment may include the display panel 151 including the active area 610 on which the image is output, the first driver 6301 that controls the image output from the first active area 6101 of the active area 610, the second driver 6302 that controls the image output from the second active area 6102 of the active area 610, the first data lines Da_j connected to the first driver 6301 to apply the image signal to the first active area 6101, and the second data lines connected to the second driver 6302 to apply the image signal to the second active area 6102, and the first data lines Da_j and the second data lines Db_j may be alternately disposed in at least one area 6103 of the active area 610.

The display panel 151 according to one embodiment may have the first at least one area 6103 along a center of both sides in the active area 610, and the first data lines Da_j and the second data lines Db_j not included in the at least one area 6103 may be respectively arranged on both sides of the at least one area 6103.

For example, when the display panel 151 according to one embodiment includes the pixels of the m*n matrix in the active area 610, the first data lines Da_j may apply the image signals to pixels arranged in rows 1 to k and k+2, and the second data lines Db_j may apply the image signals to pixels arranged in rows k+1 and k+3 to m. Here, k may be a natural number greater than 1, and m may be a natural number greater than 4.

More generally, when the display panel 151 according to one embodiment includes the pixels of the m*n matrix in the active area 610, the first data lines Da_j may apply the image signals to pixels arranged in rows 1 to k and k+2 to k+2p, and the second data lines Db_j may apply the image signals to pixels arranged in rows k+1 to k+2p−1 and k+2p+1 to m. Here, k and p may be natural numbers greater than 1, and m may be a natural number greater than 5.

In the display panel 151 according to one embodiment, the active area 610 may be divided into the first active area 6101 and the second active area 6102, and the first data lines Da_j and the second data lines Db_j may be alternately disposed in a portion where the first active area 6101 and the second active area 6102 overlap each other.

The display panel 151 according to one embodiment may control the image output from the first active area 6101 via the first driver 6301, and control the image output from the second active area 6102 via the second driver 6301. In this regard, the first active area 6101 may correspond to an area including the area with the first data lines Da_j, and the second active area 6102 may correspond to an area including the area with the second data lines Db_j.

The first driver 6301 according to one embodiment may include the first data driver 6331 for applying the image signal via the first data lines Da_j, and the first gray scale voltage generator 6341 for supplying the gray scale voltage to the first data driver 6331. Similarly, the second driver 6302 may include the second data driver 6332 for applying the image signal via the second data lines Db_j and the second gray scale voltage generator 6341 for supplying the gray scale voltage to the second data driver 6332.

In this regard, there may be the slight difference between the voltages respectively applied to the first gray scale voltage generator 6341 and the second gray scale voltage generator 6342 so as to respectively generate the gray scale voltages. The difference may generate the difference between the gray scale voltage generated by the first gray scale voltage generator 6341 and the gray scale voltage generated by the second gray scale voltage generator 6342. Alternatively, the first gray scale voltage generator 6341 and the second gray scale voltage generator 6342 may be manufactured using different chips, so that the gray scale voltages respectively output therefrom may be different from each other. The difference in the gray scale voltage may generate the luminance deviation between the first active area 6101 and the second active area 6102.

In the display panel 151 according to one embodiment, in order to prevent the user from recognizing the boundary due to the luminance deviation occurred between the first active area 6101 and the second active area 6102, in the portion in which the first active area 6101 and the second active area 6102 overlap each other, the first data lines Da_j and the second data lines Db_j may be alternately disposed.

The first driver 6301 according to one embodiment may include the first gate driver 6321 disposed at an edge of one side of the display panel 151 along the first data lines Da_j and applying the driving signal to the first active area 6101. In this regard, the first gate driver 6321 may be disposed parallel to the first data lines Da_j and may be disposed along an edge of one side of the first active area 6101. Similarly, the second driver 6302 may include the second gate driver 6322 disposed at an edge of the other side of the display panel 151 along the second data lines Db_j and applying the driving signal to the second active area 6102. In this regard, the second gate driver 6322 may be disposed parallel to the second data lines Db_j and may be disposed along an edge of one side of the second active area 6102.

The first gate driver 6321 according to one embodiment may be connected to first gate lines Ga_i that apply the driving signal. In this regard, the first gate lines Ga_i may be disposed perpendicular to the first data lines Da_j. Similarly, the second gate driver 6322 may be connected to second gate lines Gb_i that apply the driving signal. In this regard, the second gate lines Gb_i may be disposed perpendicular to the second data lines Db_j. In addition, the first gate lines Ga_i and the second gate lines Gb_i may intersect each other at the central portion 6103 of the both sides in the active area 610. In this regard, the central portion 6103 of the both sides in the active area 610 may be a portion in which the first active area 6101 and the second active area 6102 overlap each other.

The first driver 6301 according to one embodiment may include a first timing controller 6311 that provides a control signal to the first gate driver 6321 and the first data driver 6331. Similarly, the second driver 6302 may include a second timing controller 6312 that provides a control signal to the second gate driver 6322 and the second data driver 6332. In some cases, a timing controller for controlling a timing of the image output from the active area 610 may be divided into the first timing controller 6311 and the second timing controller 6312, and a fine time difference may occur between the image output from the first active area 6101 and the image output from the second active area 6102. In order to prevent the fine time difference from occurring between the image output from the first active area 6101 and the image output from the second active area 6102, the mobile terminal according to one embodiment may include control signal sink means (not shown) that synchronizes the control signals provided by the first timing controller 6311 and the second timing controller 6312.

Figure 20:
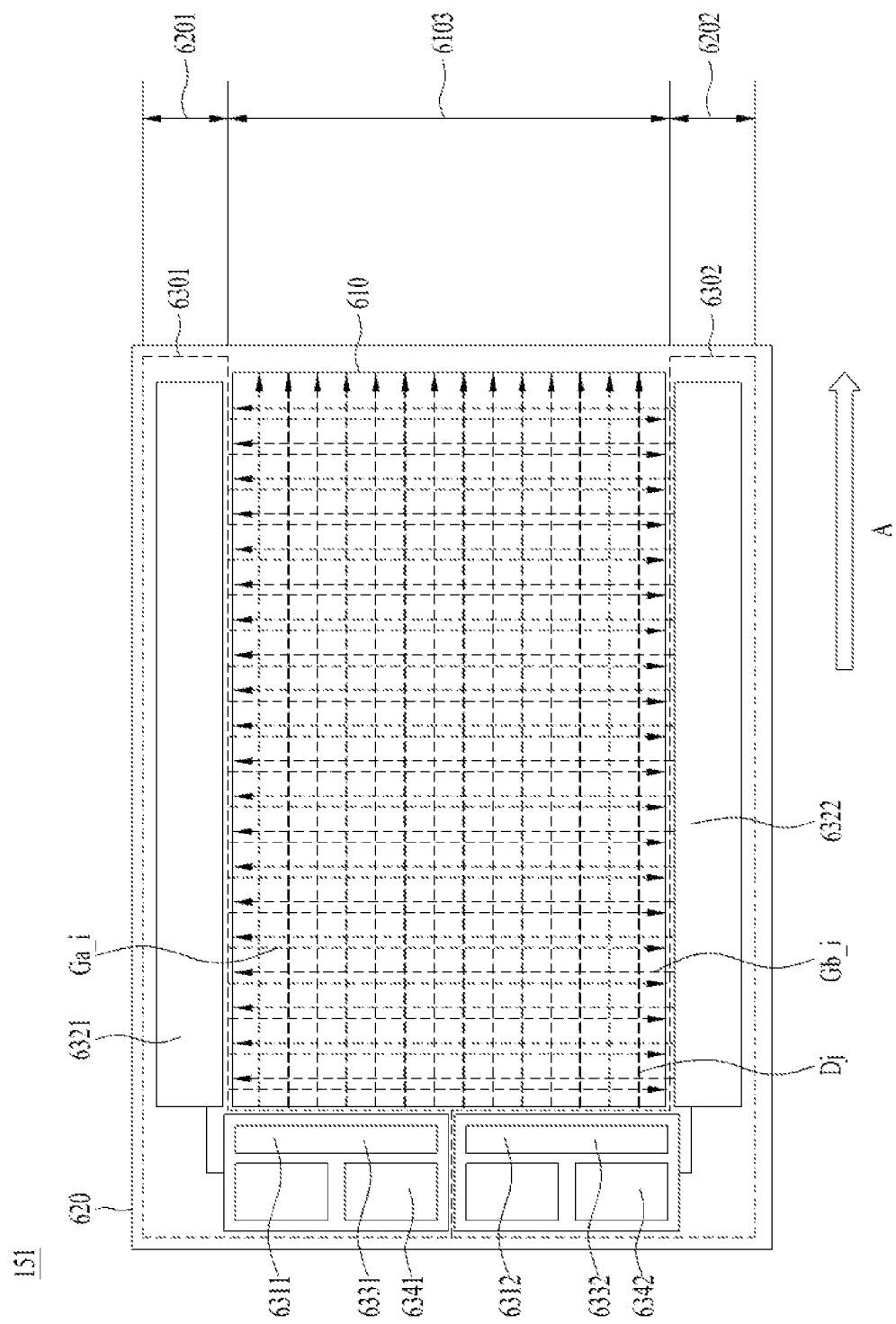
FIG. 20 shows one embodiment of an arrangement of data lines that prevents a user from recognizing a luminance deviation occurring between divided active areas.

FIG. 20 shows one embodiment of an arrangement of data lines that prevents a user from recognizing a luminance deviation occurring between divided active areas. Hereinafter, differences from the configuration in FIG. 19 will be mainly described.

In the display panel 151 according to one embodiment, in order to prevent the user from recognizing the boundary between the first active area 6301 and the second active area 6302 due to the luminance deviation, the first data lines Da_j and the second data lines Db_j may be alternately disposed in an entirety of the active area 610.

For example, in the display panel 151 according to one embodiment, when the active area 610 includes the pixels of the m*n matrix, the first data lines Da_j may apply the image signal to pixels arranged in even rows, and the second data lines (Db_j) may apply the image signal to pixels arranged in odd rows. Conversely, the first data lines Da_j may apply the image signal to the pixels arranged in the odd rows, and the second data lines Db_j may apply the image signal to the pixels arranged in the even rows.

Figure 21:
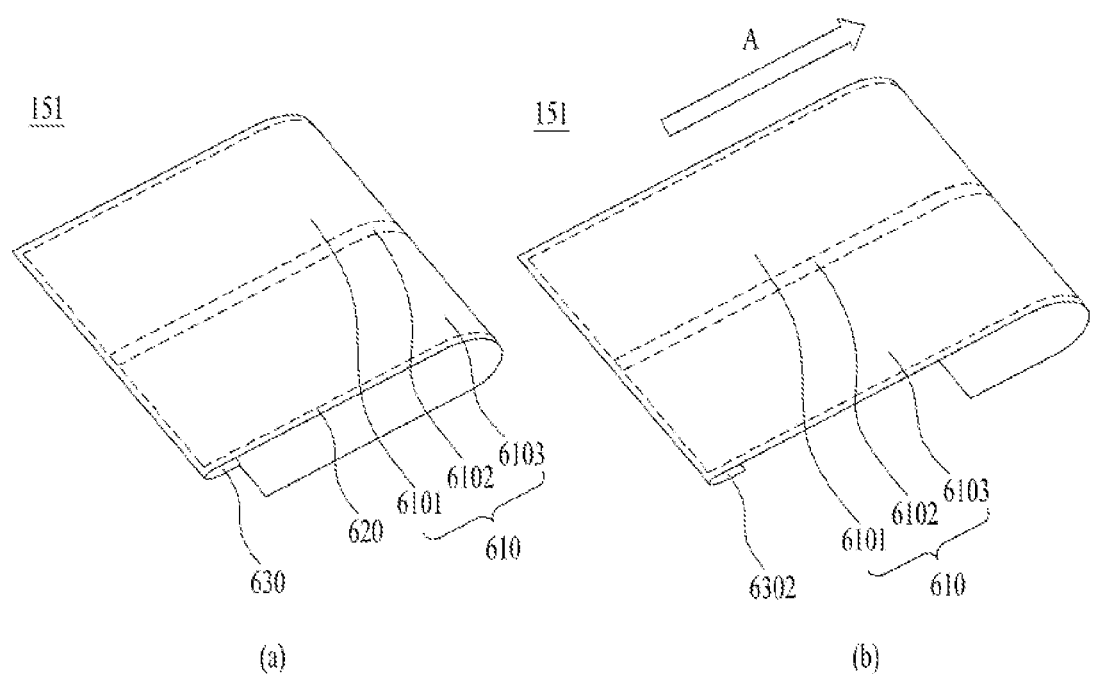
FIG. 21 shows a first state ((a) in FIG. 21) and a second state ((b) in FIG. 21) of a flexible display panel in FIG. 19.

FIG. 21 shows a first state ((a) in FIG. 21) and a second state ((b) in FIG. 21) of the flexible display panel in FIG. 19.

The display panel 151 according to one embodiment may be a flexible display panel. The mobile terminal of one embodiment may include a roller member (not shown, here, the roller member may be a component corresponding to the first roller 1028 in FIG. 5.) that changes an area of the active area 610 exposed on the front face of the mobile terminal by winding or bending the display panel 151 along a first direction A in which the first data lines Da_j or the second data lines Db_j are directed.

The mobile terminal according to one embodiment may include a first frame (see 101 in FIG. 5), the roller member, and a second frame (see 102 in FIG. 5) that is coupled to the first frame to be movable in the first direction A. The display panel 151 may be constructed to surround the second frame in the first direction A, and the area of the active area 610 exposed on the front face of the mobile terminal may be widened and the area of the active area 610 exposed on the rear face of the mobile terminal may be relatively reduced in response to the movement in the first direction A of the second frame.

Specifically, (a) in FIG. 21 is a view showing the display panel 151 separated from the mobile terminal in the first state. (b) in FIG. 21 is a view showing the display panel 151 separated from the mobile terminal in the second state. The display panel 151 may have the smallest area of the active area 610 exposed on the front face in the first state, and may have the largest area of the active area 610 exposed on the front face in the second state.

In the display panel 151 according to one embodiment, the area of the active area 610 exposed on the front face may be widened in the first direction A or reduced in a direction opposite to the first direction A. The first active area 6101 and the second active area 6102 included in the active area 610 may be disposed at both sides in a direction perpendicular to the first direction A, and may include an area 6103 in which the first active area 6101 and the second active area 6102 at least partially overlap each other at a center of the both sides. The first data lines Da_j and the second data lines Db_j described above may be alternately disposed in the area 6103 in which the first active area 6101 and the second active area 6102 at least partially overlap each other.

The detailed description above should not be construed as restrictive in all respects and should be considered as exemplary. The scope of the present disclosure should be determined by a reasonable interpretation of the appended claims, and all changes within the equivalent scope of the present disclosure are included in the scope of the present disclosure.

The invention claimed is:

1. A mobile terminal comprising:
   a display panel including an active area for outputting an image;
   a first driver for controlling an image output from a first active area of the active area;
   a second driver for controlling an image output from a second active area of the active area;
   first data lines extending in a first direction and connected to the first driver so as to apply an image signal to the first active area; and
   second data lines extending in the first direction and connected to the second driver so as to apply an image signal to the second active area,
   wherein the first data lines and the second data lines are alternately arranged in an overlap area of the active area,
   wherein the first driver includes a first data driver for applying the image signal via the first data lines, and a first gray scale voltage generator for supplying a gray scale voltage to the first data driver, and
   wherein the second driver includes a second data driver for applying the image signal via the second data lines, and a second gray scale voltage generator for supplying a gray scale voltage to the second data driver, and
   wherein voltages are respectively applied to the first gray scale voltage generator and the second gray scale voltage generator.

2. The mobile terminal of claim 1, wherein the overlap area is defined at a center of the active area in a second direction which is perpendicular to the first direction,
   wherein the first data lines not arranged in the overlap area are arranged on one side of the overlap area in the second direction, and
   wherein the second data lines not arranged in the overlap area are arranged on the other side of the overlap area in the second direction.

3. The mobile terminal of claim 1, wherein the first driver includes a first gate driver disposed in an edge of the display panel along the first data lines so as to apply a driving signal to the first active area,
   wherein the second driver includes a second gate driver disposed in an edge of the display panel along the second data lines so as to apply a driving signal to the second active area.

4. The mobile terminal of claim 3, wherein the first gate driver is connected to first gate lines, the first gate lines extending perpendicular to the first data lines for applying the driving signal,
   wherein the second gate driver is connected to second gate lines, the second gate lines directed perpendicular to the second data lines for applying the driving signal,
   wherein the first gate lines and the second gate lines intersect each other at the overlap area of the active area.

5. The mobile terminal of claim 3, wherein the first driver includes a first timing controller for applying a control signal to the first gate driver and the first data driver,
   wherein the second driver includes a second timing controller for applying a control signal to the second gate driver and the second data driver,
   wherein the mobile terminal further includes control signal sink means for synchronizing the control signals respectively provided by the first timing controller and the second timing controller with each other.

6. The mobile terminal of claim 1, wherein the display panel is a flexible display panel.

7. The mobile terminal of claim 6, further comprising:
   a roller member for changing an area of the active area exposed on a front face of the mobile terminal by winding or bending the display panel along the first direction.

8. The mobile terminal of claim 7, further comprising:
   a first frame; and
   a second frame including the roller member and coupled to the first frame to be movable in the first direction.

9. The mobile terminal of claim 1, wherein the image output from the first active area and the image output from the second active area are one connected image.

* * * * *